(12) United States Patent
Page

(10) Patent No.: US 9,666,873 B2
(45) Date of Patent: May 30, 2017

(54) APPARATUS AND METHODS FOR TREATING WATER AND GENERATING ELECTRICAL POWER

(71) Applicant: Magna Imperio Systems Corp., Wilmington, DE (US)

(72) Inventor: Grant R. Page, Chico, CA (US)

(*) Notice: Subject to any disclaimer, the term of this patent is extended or adjusted under 35 U.S.C. 154(b) by 49 days.

(21) Appl. No.: 14/734,652

(22) Filed: Jun. 9, 2015

(65) Prior Publication Data
US 2015/0357651 A1 Dec. 10, 2015

Related U.S. Application Data

(60) Provisional application No. 62/010,136, filed on Jun. 10, 2014, provisional application No. 62/100,730, filed on Jan. 7, 2015.

(51) Int. Cl.
*H01M 4/90* (2006.01)
*H01M 8/04* (2016.01)
(Continued)

(52) U.S. Cl.
CPC .......... *H01M 4/90* (2013.01); *C02F 1/4604* (2013.01); *C02F 1/4693* (2013.01);
(Continued)

(58) Field of Classification Search
CPC .. H01M 4/90; H01M 4/9041; H01M 8/04186; H01M 8/04753; H01M 8/04798;
(Continued)

(56) References Cited

U.S. PATENT DOCUMENTS

| | | | | |
|---|---|---|---|---|
| 6,656,628 B2* | 12/2003 | Chang | ............... | B23K 35/0238 |
| | | | | 429/119 |
| 2012/0135282 A1* | 5/2012 | La Mantia | ............... | H01M 6/34 |
| | | | | 429/70 |
| 2012/0292187 A1* | 11/2012 | Kim | ............... | B01D 61/44 |
| | | | | 204/527 |

FOREIGN PATENT DOCUMENTS

| | | | | |
|---|---|---|---|---|
| CA | WO 2011050473 A1 * | 5/2011 | ........... | C02F 1/4693 |
| FR | 2996780 A1 | 4/2014 | | |

(Continued)

OTHER PUBLICATIONS

The Water Network, AquaSPE, "New Sodium-Ion Desalination," available at https://thewaternetwork.com/article-FfV/new-sodium-ion-desalination-15YwaAMDbpUCpbYC4vT9gw, accessed Feb. 23, 2016 (3 pages).

(Continued)

*Primary Examiner* — Gregg Cantelmo
(74) *Attorney, Agent, or Firm* — Bibby, McWilliams & Kearney, PLLC; Shipa G. Ghurye; Christopher T. Shannon

(57) ABSTRACT

Apparatuses for generating electrical power and/or treating water desalinating salt water are described, and may include a top manifold comprising one or more inlets, a bottom manifold comprising one or more outlets, a casing connecting the top manifold and the bottom manifold to define an internal space, and at least one electrode set disposed in the internal space. The electrode set may include a silver chloride cathode in fluid communication with a first fluid container including an aqueous solution, such as diluted sodium chloride solution, and a silver anode in fluid communication with a second fluid container including another aqueous solution, e.g., a higher concentration sodium chloride solution. The electrode set also may include a membrane that allows chloride and sodium ions to pass therethrough, and a (Continued)

connector electrically connecting the cathode to the anode to form an electrical circuit.

19 Claims, 20 Drawing Sheets

(51) Int. Cl.
| | |
|---|---|
| *H01M 8/08* | (2016.01) |
| *H01M 8/20* | (2006.01) |
| *C02F 1/46* | (2006.01) |
| *C02F 1/28* | (2006.01) |
| *H01M 8/04186* | (2016.01) |
| *C02F 1/469* | (2006.01) |
| *C02F 1/461* | (2006.01) |
| *H01M 8/04746* | (2016.01) |
| *H01M 8/04791* | (2016.01) |
| *C02F 103/08* | (2006.01) |

(52) U.S. Cl.
CPC ....... *C02F 1/46104* (2013.01); *H01M 4/9041* (2013.01); *H01M 8/04186* (2013.01); *H01M 8/04753* (2013.01); *H01M 8/04798* (2013.01); *H01M 8/08* (2013.01); *H01M 8/20* (2013.01); *C02F 1/283* (2013.01); *C02F 2001/46138* (2013.01); *C02F 2103/08* (2013.01); *C02F 2201/006* (2013.01); *C02F 2201/007* (2013.01); *C02F 2201/008* (2013.01); *C02F 2201/009* (2013.01); *C02F 2201/46* (2013.01); *C02F 2201/4614* (2013.01); *C02F 2201/46115* (2013.01); *C02F 2201/46135* (2013.01); *C02F 2201/46145* (2013.01); *C02F 2201/46185* (2013.01); *C02F 2209/005* (2013.01); *C02F 2209/008* (2013.01); *C02F 2209/03* (2013.01); *C02F 2209/05* (2013.01); *C02F 2209/06* (2013.01); *C02F 2209/40* (2013.01); *C02F 2303/10* (2013.01); *H01M 2300/0002* (2013.01); *Y02E 60/528* (2013.01); *Y02W 10/30* (2015.05); *Y02W 10/37* (2015.05)

(58) Field of Classification Search
CPC .. H01M 8/08; H01M 8/20; H01M 2300/0002; C02F 1/4604; C02F 1/46104; C02F 1/4693; C02F 1/283; C02F 2001/46138; C02F 2103/08; C02F 2201/006; C02F 2201/007; C02F 2201/008; C02F 2201/009; C02F 2201/46; C02F 2201/46115; C02F 2201/46135; C02F 2201/4614; C02F 2201/46145; C02F 2201/46185; C02F 2209/005; C02F 2209/03; C02F 2209/05; C02F 2209/06; C02F 2209/40; C02F 2303/10; Y02E 60/528; Y02W 10/30; Y02W 10/37
See application file for complete search history.

(56) References Cited

FOREIGN PATENT DOCUMENTS

| JP | 2013-012322 A | 1/2013 |
|---|---|---|
| WO | WO 2009/077992 A2 | 6/2009 |
| WO | WO 2010/115287 A1 | 10/2010 |

OTHER PUBLICATIONS

Kim, J. et al., "Energy Harvesting From Salinity Gradient by Reverse Electrodialysis With Anodic Alumina Nanopores", *Energy*, vol. 51, pp. 413-421(2013).

Electrodialysis Reversal Technology et al., "Fact Sheet GE 2020 EDR Systems Standard Design and Scope of Supply", *GE Power & Water, Water & Process Technologies*, XP0555241965 (2013) (3 pages).

International Search Report for PCT/US2015/035044, dated Jan. 26, 2016 (6 pages).

Smith, K. et al., "Na-Ion Desalination (NID) Enabled by Na-Blocking Membranes and Symmetric Na-Intercalation: Porous-Electrode Modeling," *J. Electrochem. Soc.*, vol. 163, No. 3, pp. A530-A539 (2016).

* cited by examiner

APPARATUS AND METHODS FOR TREATING WATER AND GENERATING ELECTRICAL POWER

CROSS-REFERENCE TO RELATED APPLICATIONS

This application claims benefit of priority from U.S. Provisional Application No. 62/010,136, filed on Jun. 10, 2014, and U.S. Provisional Application No. 62/100,730, filed on Jan. 7, 2015, each of which is incorporated by reference herein in its entirety.

TECHNICAL FIELD

The present disclosure relates generally to generating electrical power and the desalinization of salt water. More specifically, the present disclosure relates to apparatus and methods for generating electrical power and treating salt water using oxidation-reduction chemical reactions.

BACKGROUND

The need for safe and clean sources of power and fresh water has grown in recent times due to increased awareness of environmental damage (e.g. air pollution, water shortage, water pollution, and noise pollution) that may be caused by the use of fossil fuels. In addition, an increase in the use of electronic devices and electrical appliances has increased the need for sources of electrical power. Various electrochemical reactions have been used to generate electricity including lithium ion cells, hydrogen fuel cells, reversed electrodialysis, and methanol fuel cells. These cells may produce small amounts of electrical power, and in the case of fuel cells and batteries, may require harsh chemical conditions.

In addition to a need for a clean energy source, many areas around the world experience water shortages or brackish water supply and military or commercial ships supply passengers with water having a high total dissolved solids (TDS) concentration. Various methods have been used to desalinate water such as reverse osmosis or solar power. These methods often require large capital costs, high maintenance costs, and are not very efficient. Adequate removal of salt (e.g., NaCl) remains difficult in many situations.

Thus a need exists for improved methods and systems for generating electrical power and the desalinization of salt water that is safe, cost effective, and less harmful to the environment.

SUMMARY

Embodiments of the present disclosure relate to, among other things, methods and systems for generating electrical power and the desalinization of salt water. Each of the embodiments disclosed herein may include one or more of the features described in connection with any of the other disclosed embodiments.

The present disclosure includes an apparatus comprising a top manifold comprising at least one inlet; a bottom manifold comprising at least one outlet; a casing connecting the top manifold and the bottom manifold to define an internal space therebetween; and at least one electrode set disposed in the internal space, the at least one electrode set comprising: a silver chloride cathode in fluid communication with a first fluid container comprising a first aqueous solution comprising sodium chloride; a silver anode in fluid communication with a second fluid container comprising a second aqueous solution comprising sodium chloride; a membrane disposed between the first fluid container and the second fluid container, the membrane configured to allow sodium and chloride ions to pass therethrough; and a connector electrically connecting the cathode to the anode to form an electrical circuit. The membrane may be a semi-permeable, porous membrane.

The apparatus may comprise a controller, wherein the controller may be configured to automatically control fluid flow from the at least one inlet to the at least one outlet and/or may be configured to automatically control a sodium chloride concentration of the first aqueous solution. In some embodiments, the second aqueous solution may have a sodium chloride concentration ranging from about 0.2 M to about 6.0 M. The at least one electrode set may include a single electrode comprising silver chloride plated onto a first side of the electrode to form the cathode, and silver plated onto a second side of the electrode to form the anode. In some embodiments, the apparatus may comprise a filtration system in fluid communication with the at least one inlet. The at least one electrode set of the apparatus may comprise a plurality of electrode sets of a cell, and the casing of the apparatus may include a plurality of cells each independently removable from the casing.

The present disclosure further includes a method for generating electrical power and producing desalinated water, comprising: electrically connecting a cathode comprising silver chloride to an anode comprising silver; exposing the cathode to a flow of a first aqueous solution comprising sodium chloride, and exposing the anode to a flow of a second aqueous solution comprising sodium chloride, wherein the first aqueous solution has a sodium chloride concentration 1 to 4 orders of magnitude lower than a sodium chloride concentration of the second aqueous solution to provide a concentration differential of at least 1 order of magnitude, and wherein the cathode is separated from the anode by a semi-permeable membrane configured to allow chloride and sodium ions to pass therethrough; and automatically controlling the sodium chloride concentration of the first aqueous solution to maintain the concentration differential; wherein the method generates electrical power; and wherein the sodium chloride concentration of the second aqueous solution is lower after contacting the anode than the sodium chloride concentration of the second aqueous solution before contacting the anode.

According to some aspects of the methods disclosed herein, the sodium chloride concentration of the second aqueous solution may range from about 0.2 M to about 6.0 M before contacting the anode and/or the sodium chloride concentration of the first aqueous solution may range from about 0.006 M to about 0.1 M. The method may further comprise continuously delivering the second aqueous solution to the anode and/or may further comprise recirculating the flow of the first aqueous solution to repeatedly contact the cathode. Each of the cathode and the anode may have a planar, mesh-like configuration. In some embodiments, the membrane may be a porous membrane. Further, in some embodiments, the cathode and the anode may form a first electrode set of a plurality of electrode sets, wherein the plurality of electrode sets are connected in parallel to form a cell. The cell may generates from about 240 mV to about 50 V of power, for example. The method may further comprise electronically controlling the flow of the second aqueous solution, and/or may further comprise filtering the second aqueous solution prior to exposure to the anode.

The present disclosure further includes an apparatus comprising a plurality of electrode sets disposed in a casing of a module, each electrode set comprising: a silver chloride cathode in fluid communication with a first fluid container comprising a first aqueous sodium chloride solution; a silver anode in fluid communication with a second fluid container comprising a second aqueous sodium chloride solution; a membrane disposed between the first fluid container and the second fluid container, the membrane configured to allow chloride and sodium ions to pass therethrough; and a connector electrically connecting the silver cathode to the silver chloride anode to form an electrical circuit; wherein the module comprises a controller configured to automatically maintain a differential in concentration of sodium chloride between the first aqueous sodium chloride solution and the second aqueous sodium chloride solution from 1 to 4 orders of magnitude.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 3A and 3B illustrate exemplary configurations of electrodes according to one or more embodiments of the present disclosure, wherein FIG. 3A shows an exemplary diagram of electrode pairs of one cell connected in parallel, and FIG. 3B shows an exemplary diagram of cells connected in series.

FIGS. 11A and 11B show an exemplary apparatus according to one or more embodiments of the present disclosure, wherein FIG. 11B shows a cross-section of FIG. 11A.

DETAILED DESCRIPTION

Particular aspects of the present disclosure are described in greater detail below. The terms and definitions as used and clarified herein are intended to represent the meaning within the present disclosure.

The singular forms "a," "an," and "the" include plural reference unless the context dictates otherwise. The terms "approximately" and "about" mean to be nearly the same as a referenced number or value. As used herein, the terms "approximately" and "about" generally should be understood to encompass ±5% of a specific amount, frequency, or value.

The present disclosure is drawn to systems, apparatuses, and methods for generating electrical power and/or treating water. More specifically, the present disclosure is directed to systems, apparatuses, and methods for generating electrical power and/or desalinating water using a fluidic system. In some embodiments, the apparatus or system may comprise silver (Ag) and silver chloride (AgCl) electrodes, in combination with an ion concentration gradient (e.g., ions $Cl^-$ and/or $Na^+$), providing for a flow and/or forced diffusion of ions through a membrane between the electrodes.

Figure 1:
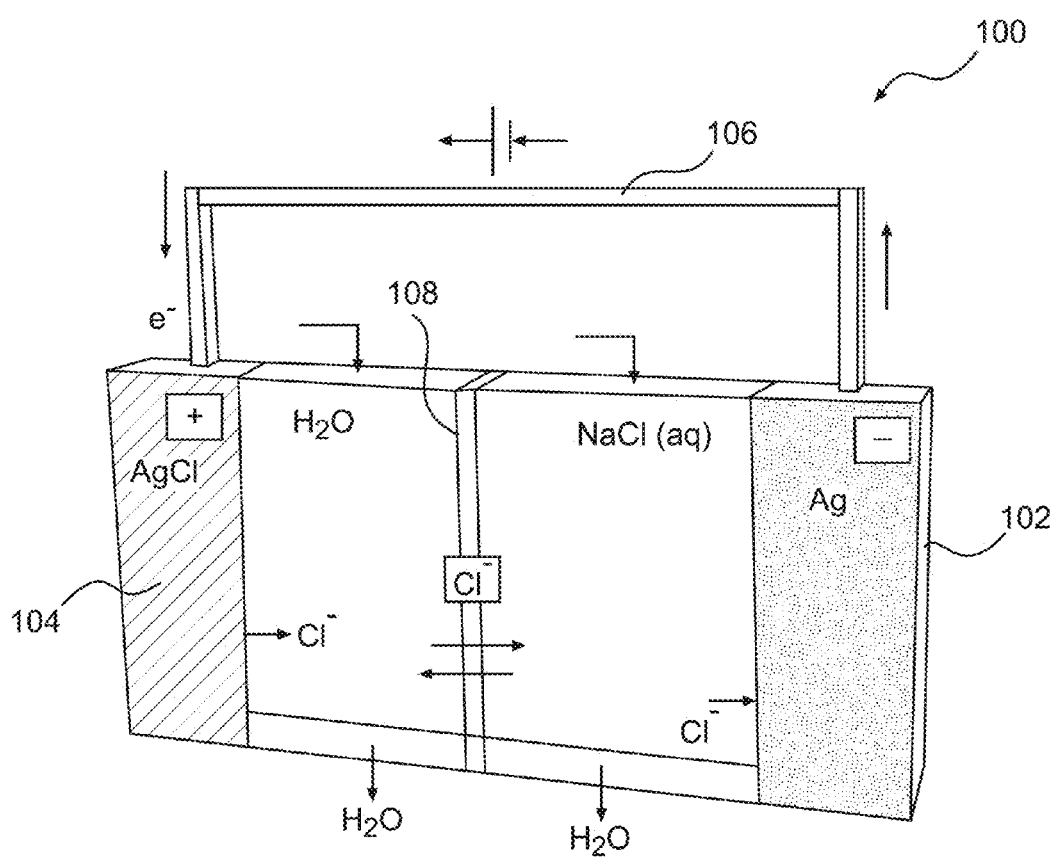
FIG. 1 is a schematic diagram of an exemplary system for producing electrical energy and/or treating water, according to one or more embodiments of the present disclosure.

FIG. 1 is a schematic diagram of an exemplary system 100 of an apparatus for producing electrical energy and/or treating water (such as, e.g., desalinating water), according to an exemplary embodiment of the present disclosure. The various components shown in the system 100 may connect to form a circuit in which electrical power may be generated based on an oxidation-reaction in which electrons may be extracted and used to drive a load to remove the $Cl^-$ and $Na^+$ ions present in the salt water. The various components shown in the system 100 may connect to form a circuit that causes an oxidation-reduction reaction in which the product is desalinated water of varying concentrations by removing the $Cl^-$ and $Na^+$ ions present in the salt water.

As shown in FIG. 1, the system may include electrodes, such as anode 102 and cathode 104. The electrodes 102, 104 may be manufactured using any suitable material(s), such as metals and metal alloys (including, but not limited to, stainless steel, grade 2 titanium (Ti), nickel (Ni) alloys, and or copper (Cu)) and ceramic(s), and may have any suitable size, shape, and geometry. The electrodes 102, 104 may have various surface features, such as protrusions, coatings, and/or identifying features (e.g., text, symbols, and/or colors). In some aspects, the anode 102 may comprise silver (Ag), e.g., a coating of Ag, and the cathode 104 may comprise silver chloride (AgCl), e.g., a coating of AgCl. The electrodes may be coated in any suitable manner, for example via plating, spraying, vapor deposition, or hot-dipping. The electrode coatings may have varied thicknesses and patterns. In some embodiments, the anode 102 and/or the cathode 104 may have a planar, mesh-like configuration as discussed further below.

The anode 102 and cathode 104 may each be in contact with a solution (e.g. fully or partially immersed in the solution), such as aqueous solutions. The anode and/or cathode solutions may comprise one or more electrolytes, providing for ions in solution. For example, the anode and/or cathode electrolyte solutions may comprise sea-salt (e.g., a seawater solution), sodium chloride (NaCl), potassium chloride (KCl), rubidium chloride (RbCl), and/or cesium chloride (CsCl). The anode and cathode solutions may comprise the same electrolyte(s) or different electrolytes.

In some embodiments, the cathode 104 may be immersed in an aqueous solution having an electrolyte (e.g., NaCl) concentration ranging from about 0.003 M to about 0.01 M, or from about 0.005 M to about 0.075 M, such as, e.g., a concentration of about 0.006 M. The cathode aqueous solution may comprise tap water, bottled water; dialysis water, reverse osmosis (RO) water, and/or fresh water or deionized (DI) water with small amounts of salt added. The term "fresh water" as used herein generally refers to water having low concentrations of dissolved salts and other dissolved solids. In some embodiments, the cathode solution may comprise DI water with small amount of a suitable salt such as sodium chloride (NaCl) added to meet a desired molarity, e.g., a concentration between about 0.003 M and about 0.01 M.

The anode 102 may be immersed in a solution having a different electrolyte and/or a different concentration of electrolyte than the cathode solution. In some embodiments, for example, the anode solution may have a concentration of electrolyte (e.g., NaCl) ranging from about 0.2 M to about 8.0 M, such as from about 1.0 M from about 5.0 M, such as, e.g., a concentration of about 3.0 M. The anode electrolyte may comprise seawater, runoff water from streets, water from a fracking process ("frac water"), reverse osmosis high salinity byproducts, aqueous KCl, aqueous RbCl, and/or aqueous CsCl.

The anode and cathode solutions may have different concentrations of electrolyte(s). In some embodiments, for example, the aqueous solution in contact with the anode may have a higher electrolyte concentration than the aqueous solution in contact with the cathode. For example, the cathode solution may comprise deionized water with a small amount of salt added, filtered water, and/or any suitable types of fresh water having a relatively low concentration of salt, whereas the anode solution may comprise seawater or other source of water with a relatively high concentration of salt. In some embodiments, the cathode and/or the anode solutions may be filtered. For example, in examples comprising seawater (e.g., as the anode solution), the seawater may be filtered with any suitable filter or filtering device such as, e.g., carbon filters or micron filters, among other examples, to remove any undesirable matter (e.g., minerals, calcium, sulfate, microorganisms, and/or other organic matter).

In some embodiments, the aqueous solution in contact with the anode may be maintained to have an electrolyte concentration at least one order of magnitude greater than the aqueous solution in contact with the cathode. For example, the anode solution may have a concentration of electrolyte from one to four orders of magnitude greater, from one to three, from one to two, from two to four, or from two to three orders of magnitude greater than the concentration of electrolyte in the aqueous solution in contact with the cathode.

The electrolyte concentration differences may result from a difference between a relatively higher concentration of electrolyte and a relatively lower concentration of electrolyte. Exemplary types of solutions providing for a relatively higher concentration of electrolyte include, but are not limited to, an influent stream of salt water with a concentration of NaCl between about 0.2 M and about 6.0 M, filtered ocean water (e.g., filtered for ions, dissolved solids, and/or suspended solids), unfiltered ocean water, filtered industrial salty wastewater (e.g., filtered for ions, dissolved solids, and/or suspended solids), unfiltered industrial salty wastewater, filtered brackish groundwater (e.g., filtered for ions, dissolved solids, and/or suspended solids), unfiltered brackish groundwater, and any other sources of salt water with a NaCl (or other salt, including other chloride salts) providing for a concentration that may be one to three orders of magnitude higher than the concentration of electrolyte in the relatively lower concentration of electrolyte. Exemplary types of solutions providing for a relatively lower concentration of electrolyte include, but are not limited to, DI water with small amounts of salt added, fresh water having low electrolyte concentrations, a contained loop of fresh water with a low or relatively low concentration of NaCl (or other salt, including other chloride salts), such as, e.g., water with a concentration between about 0.006 M and about 0.1 M of electrolyte, diluted salt water with a NaCl (or other salt, including other chloride salts) concentration, and any other sources of water having an electrolyte concentration that may be one to three orders of magnitude lower than the concentration of the relatively higher concentration of salt water described above.

The anode 102 and cathode 104 may be separated by a membrane 108. The membrane 108 may allow the passage of ions therethrough, e.g., a semi-permeable membrane, permeable membrane, porous membrane, proton exchange membrane (PEM) or any combination thereof. The membrane 108 may comprise any suitable material or combination of materials, such as silica, (including, e.g. high temperature glass VYCOR) and/or a polymer. VYCOR is an open-cell, porous glass characterized by high absorbing properties that may allow it to rapidly absorb water. VYCOR may provide freedom from foreign contaminants, e.g., due to its open-cell network with selective permeability. The membrane 108 may comprise one or more polymers having inorganic nanoparticles incorporated into the polymer(s).

The membrane 108 may include one or more porous portions having any suitable pore size, such as an average pore diameter ranging from about 40 Angstroms to about 200 Angstroms, or from about 100 pm to about 300 pm. The pores of the membrane 108 may be homogeneous.

The membrane 108 may be configured to selectively allow the passage of ions. The membrane 108 may allow for the passage of ions therethrough including, but not limited to, Na⁺ and/or Cl⁻. For example, the membrane 108 may allow chloride ions (Cl⁻) and sodium ions (Na⁺) to pass through it from the anode solution into the cathode solution. The membrane 108 may be configured to allow for the passage of ions therethrough other than Na⁺ and/or Cl⁻. The membrane 108 may have a low or relatively electrical resistance under cell operating conditions (after the membrane 108 is wetted), and may provide long-term chemical stability in an oxidizing and reducing environment. Further, the membrane 108 may provide good mechanical strength, e.g., at low cost. In some embodiments, the membrane 108 may have an enhanced chemical durability over a pH range, such as a pH range of 1 to 14.

Referring again to FIG. 1, an electrical circuit between the anode and cathode 102, 104 may be completed by electrically connecting the anode and cathode 102, 104, e.g., via one or more wires 106 comprising any suitable electrically conductive materials (including, but not limited to, copper and/or other metals or metal alloys). A difference in potential between the anode and cathode half reactions may drive an oxidization-reduction (Redox) reaction. In some embodiments, the cathode 104 may be immersed in a low or relatively low concentration salt solution and may undergo reduction, while the anode 102 may be immersed in a higher concentration salt solution and may undergo oxidation to produce a net voltage and current.

In embodiments wherein the anode 102 comprises silver (Ag) and the cathode 104 comprises silver chloride (AgCl), the reactions may include:

$$Ag^+ + e^- \rightarrow Ag_{(s)} \qquad \text{Eq. 1}$$

$$AgCl_{(s)} + e^- \rightarrow Ag_{(s)} + Cl^- \qquad \text{Eq. 2}$$

with Eq. 2 generating a voltage of about 0.223 $V_{NHE}$. The transfer of electrons from the anode 102 to the cathode 104 may be used to drive a load between the electrodes 102, 104, and/or may drive diffusion of Na⁺ and Cl⁻ ion through the membrane 108 from the anode electrolyte to the cathode electrolyte. This voltage measured between the connection of the anode 102 and the cathode 104 may include all the resistances present in the system, such as, e.g., resistance of the anode 102, resistance of the anode electrolyte, resistance of the membrane 108, resistance of the cathode electrolyte, resistance of the cathode 104, and/or resistances of the wire(s) 106.

A driver, such as a pump or other suitable drive means, may be connected to a conduit to allow the passage of salt solution into and out of the system 100 in order to sustain the energy generated and/or volume of desalinated water produced from the system 100 e.g., to prevent the reaction from reaching equilibrium by maintaining an imbalance of Cl⁻ ions between the anode and cathode solutions.

Electrical energy generated by the system 100 may be transferred to any suitable device that consumes and/or stores electrical power, e.g., through DC to DC converter or an inverter to create a 3-phase AC power output for grid supply. For example, batteries, electronic devices such as vehicles, and appliances may directly or indirectly receive power from the system 100. In some aspects, the system 100 may be used with other sources of electrical power to supplement electrical power needs. For example, the system 100 may be used as a back-up generator to provide power during a power outage. In other aspects, the system 100 may be used in conjunction with other sources of power, such as power-generating solar panels, power generating windmills, and/or power generating watermills.

In some aspects, the system 100 may be scalable based on the amount of power desired. For example, the system 100 may be used on a relatively small scale to power devices using a smaller amount of power such as mobile phones, or the system 100 may be configured on a relatively large scale to provide larger amounts of electrical power, (e.g. for hospitals, military units, and/or schools).

Systems according to the present disclosure may be used to lower the salt concentration of water, thus treating or "desalinating" the water. The term "desalinate" as used herein generally refers to reducing a concentration of salt in water, and includes, e.g., circumstances and situations in which an amount of salt has been removed from water, but the desalinated water still includes a low or relatively low concentration of salt. For example, desalination of water may render the water potable or non-potable but suitable for various industrial or commercial applications.

Water may be desalinated through three processes or characteristics of the systems disclosed herein: oxidation-reduction reactions, diffusion, and concentration gradients. The systems may generate electrical power (as discussed above) and treat/desalinate water simultaneously. For example, desalination of salt water may occur on the anode side of an electrode pair, e.g., the anode solution. For the system of FIG. 1, for example, Cl⁻ ions may be removed from the anode electrolyte solution to be plated onto the Ag anode. This, in turn, may drive the diffusion of Na⁺ from the anode electrolyte solution to the cathode electrolyte solution through the membrane due to an increased amount of positive ions in the anode electrolyte solution. The higher concentration of Cl⁻ in the anode electrolyte solution compared to the lower concentration in the cathode electrolyte solution may create the driving force of Cl⁻ ions from the anode electrolyte solution to the cathode electrolyte solution, resulting in a lower concentration of NaCl (including, e.g., generation of fresh water with little to no NaCl) on the anode side of the cell.

The system 100 may be scalable based on the amount of desalinated water desired. For example, the system 100 may be used on a relatively small scale to produce supplemental water supply for an entity on the coast line or a ship deployed in the ocean, or the system 100 may be configured on a relatively large scale to treat large volumes of salt water, such as salt wastewater. Further, for example, the system 100 may be scaled up and configured to treat 100,000 gallons of salty wastewater (e.g., brackish water, salty brine, fracking backlash water) a day, and desalinate it to a salt concentration desired. The desalinated water produced by the system 100 may be transferred to any suitable hydraulic conveyance system or storage container. For example, the desalinated water may be transferred to potable water storage tank, recycled water storage tank, wash down water piping system, and/or a drinking water piping system.

Figure 2:
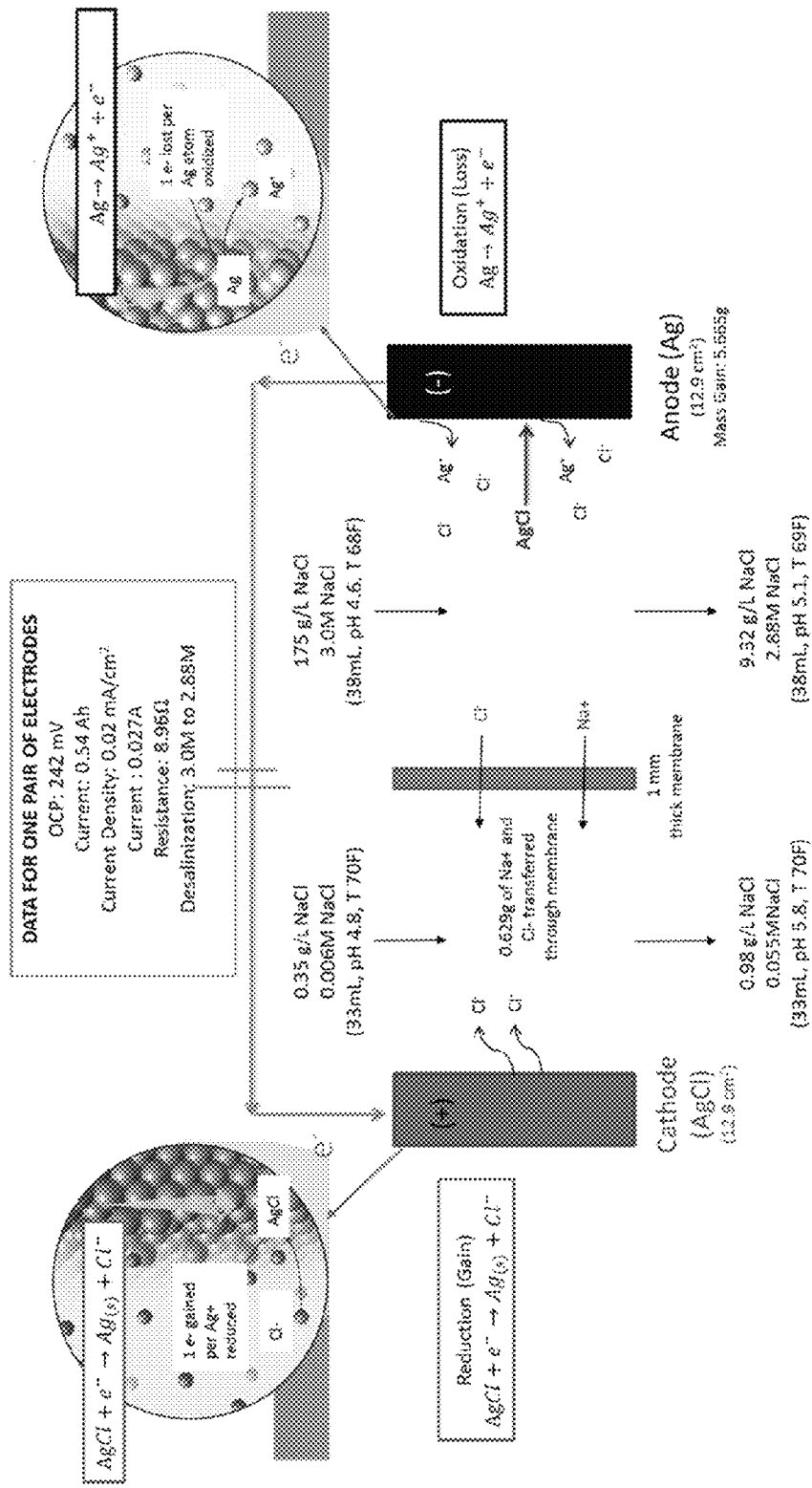
FIG. 2 is a schematic diagram of a system with exemplary operating conditions, according to one or more embodiments of the present disclosure.
Figure 3A:
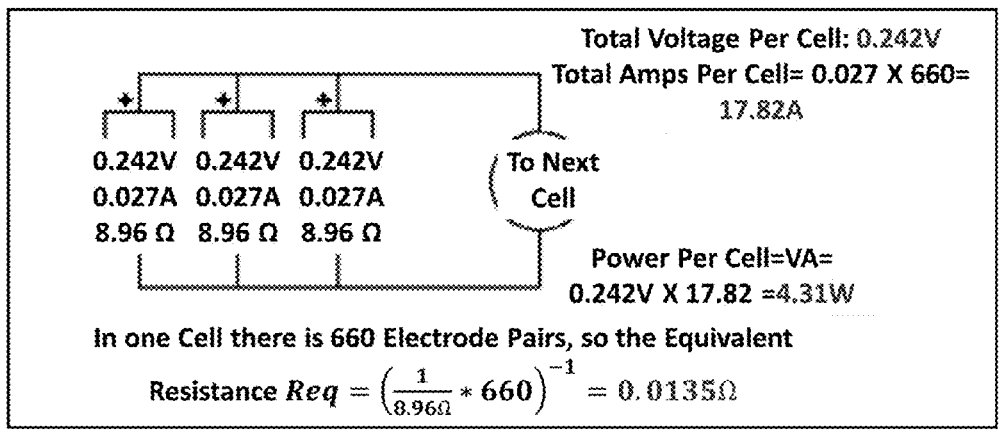
Figure 3B:
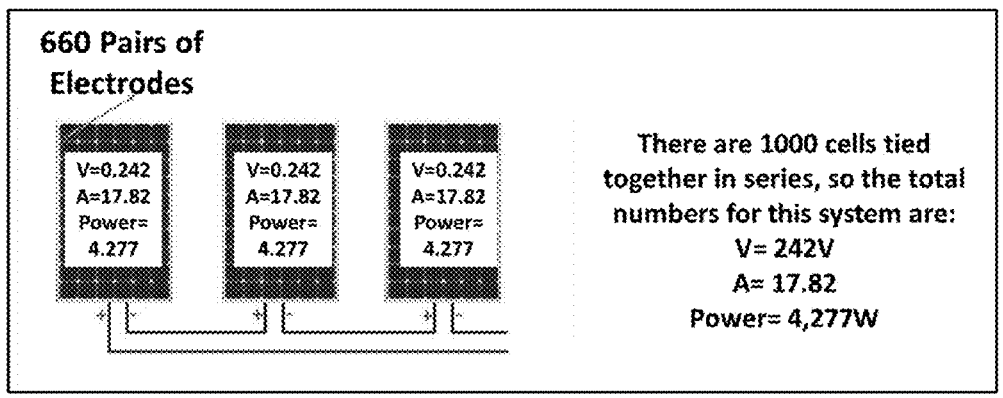

FIG. 2 illustrates an exemplary one-electrode system (e.g., similar to the system 100 shown in FIG. 1), discussed in Example 3 below. The total resistance for the one electrode pair of FIG. 2 was measured at 8.96Ω, and the total current per electrode pair was measured at 0.027 Å. In a larger system, individual electrode pairs (e.g., shown in FIGS. 1 and 2) may be connected in parallel and/or in series to adjust the voltage and current. FIG. 3A illustrates multiple electrode pairs connected in parallel to increase the overall current. In some embodiments, for example, 660 electrode pairs may be connected in parallel to form one cell, with an equivalent resistance of 0.0135Ω, a total current of 17.82 Å per cell, and power of 4.31 W per cell. FIG. 3B illustrates multiple cells according to FIG. 3A connected in series to increase the overall voltage. Connecting 1000 cells in series, for example, may provide a voltage of 242 V, a current of 17.82 Å, 4,277 W of power, and an equivalent resistance (Req) of 0.0135Ω. A system according to these parameters (design of 10 ft$^3$) may be used to treat (e.g., desalinate) 4,100 gal/day of water, for a total NaCl removed from the water of 150,000 g per day.

In some embodiments, a large scale configuration of the system 100 may use natural bodies of water to supply the solutions used in the system 100. For example, one or more channels may be formed in a body of water and used as the anode and cathode solutions such as ocean water parallel to a fresh water stream or river. The cathode 104 may be placed in the ocean channel and the anode 104 may be placed in the fresh water stream or river, the two bodies of water may be in communication via a membrane, and the electrodes 102, 104 may be connected by a membrane and an electron conducting conduit to complete the circuit. An additional channel may be formed to allow some of the ocean water to evaporate to increase the concentration of salt in the ocean water. Further, the electrodes may be switched, e.g. the electrode in the ocean channel may be placed in the fresh water stream or river, and the electrode in the fresh water stream or river may be placed in the ocean channel when the silver chloride or silver coatings on each has depleted. The electrodes may be switched in any suitable manner, such as automatically moved via a pivot or turn-table.

In some embodiments, a large scale configuration of the system 100 may use other technologies to filter and rid unwanted solids (suspended or dissolved) from the water taken in from natural bodies of water or industrial processes. This process may be done, for example, using one or more carbon and/or micron filters, such as filters from about 2 microns to about 30 microns, to ensure substantially all solids and foreign matter are filtered out. This may comprise a pre-filtering process, before a salt solution enters the system for treatment.

Figure 4:
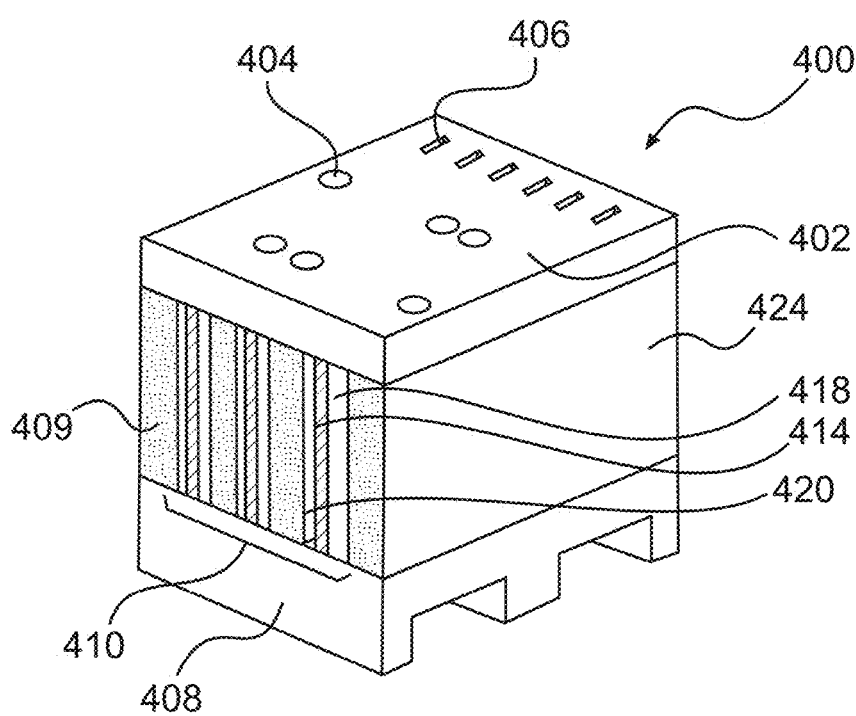
FIG. 4 is a perspective view of an exemplary apparatus, according to one or more embodiments of the present disclosure.

The systems illustrated in FIGS. 1, 2, 3A, and 3B may form part of an apparatus. FIG. 4 is a perspective view of an exemplary apparatus 400 for generating electrical power and/or desalinating water according to some embodiments of the present disclosure. The apparatus 400 may generate electrical power and/or desalinate water using an oxidation-reduction reaction e.g., via silver chloride and silver electrodes in fresh water and salt water solutions in the manner described above in reference to FIGS. 1 and 2.

The apparatus 400 may include a top manifold 402, which may be located on top of the apparatus 400. The top manifold 402 may include one or more modules for housing various electrical and communication components. For example, the top manifold 402 may include a first module configured to house electrical components 406 of the apparatus 400, such as circuit boards, wiring, and resistors. The wiring may be configured to harness the electrical power generated by apparatus 400 and transfer it to a connection port (e.g. universal serial bus (USB) port or a three prong standard UL plug) for connecting to a device that consumes or stores electrical power such as a battery, electronic device, vehicle, boat, and/or appliance. The electrical components 406 also may include one or more processors, such as processing chips or microprocessors which may be pre-programmed or actively controlled and which may perform various processing functions, such as analyzing and/or controlling the voltage, current, resistance, and/or other properties of the apparatus 400.

In addition, the electrical components 406 may include various sensors configured to measure characteristics of the system (e.g. voltage, current, resistance, pH, solution concentrations, pressure, and/or flow) and/or a control system which may control various properties of the apparatus 400, such as the amount of power generated and/or the fluid levels and fresh water effluent steam in the apparatus 400 (e.g. voltage, current, pH, conductivity, and/or resistance). The electrical components also may send and receive instructions to refill, drain, change the fluid pressure, and/or replace fluids (e.g. fresh water and/or salt water), filters, electrodes, and/or other components of the apparatus.

The first module also may include communication components, such as a port for connecting to a network, a wireless receiver, Bluetooth receiver and/or transmitter, and/or any other suitable communication ports. The electrical components 406 may be comprised of any suitable plastics, nonconductive materials, and/or electrically conductive materials (e.g. copper and/or other metals or metal alloys).

The top module 402 also may include a second module configured to house a display, such as a digital screen, which may be configured to display various properties of the apparatus 400, such as current, power, voltage, pH, concentrations, and water levels. This information may be displayed in real-time. The display may include any suitable technologies, such as a LCD, LED, and/or plasma display, and may include any suitable features, such as touchscreen features. The touchscreen features may be configured to display a graphical user interface (GUI), which may be used to navigate and show the various properties of the apparatus. The display also may include one or more input devices such as a touch screen input, keyboard, and/or buttons to input user instructions for processing by the control unit.

The top module 402 also may be configured to input fluids, such as water, into the apparatus 400 via one or more inlets 404. The inlets 404 may be configured to directly deliver fluid to suitable water storage portions of the apparatus and keep the fluids from coming in contact with the electrical and display components of the apparatus 400. The top manifold 402 may be manufactured using any suitable materials such as plastics, metals and metal alloys, ceramics, and combinations thereof. The top manifold 402 may have any suitable size, shape, inlet configuration and geometry.

The apparatus 400 also may include a bottom manifold 408. The bottom manifold 408 may be located on the bottom of the apparatus 400 and may be configured to allow fluid (e.g., aqueous solutions, such as aqueous sodium chloride solutions, etc.) to be drained from portions of the apparatus 400. The bottom manifold 408 may have any suitable shape, size, outlet configuration and geometry, for example, the bottom manifold 408 may have sloped side portions to allow fluid to drain out of the apparatus 400. In some examples, the bottom manifold 408 may include legs, wheels, rollers, and/or any other suitable structural components to maintain the apparatus 400 in a stable upright configuration and/or allow movement of the apparatus 400. The apparatus may be configured to function at any angle. In some embodiments, the electrodes may be disposed in the apparatus 400 such that they extend generally perpendicular to the force of gravity. The bottom manifold 408 may include one or more outlets configured to allow fluid to exit the apparatus 400. For example, the outlet(s) may connect to a hose, pipe or water storage tank. In some aspects, water from the outlet(s) may be re-used by the apparatus 400 (e.g., following treatment and/or by re-introducing into the inlets 404).

The top and bottom manifolds 402, 408 may be coupled to casing components 424 of the apparatus 400, which may form sidewalls of the apparatus. Together, the top and bottom manifolds 402, 408 and the casing components 424 may define an internal space for housing the power generating and/or desalinization components of the apparatus 400. The space may be configured to prevent leakage of fluid and/or air. The casing components 424 may be manufactured using any suitable materials, such as plastic, metal, and/or ceramic and may include a transparent portions for viewing internal portions of the apparatus.

The apparatus 400 also may be coupled to, or may include, a filtration system having one or more filters. The filtration system may be configured to filter seawater, e.g., and output fresh water by filtering the seawater through a filter or a series of filters before the salt water enters the cell. As mentioned above, in some embodiments, the apparatus 400 may include, or otherwise may be coupled to, a filtration system. The filtration system may comprise, for example from 1 to 10 filters, e.g., seven carbon filters and/or micron filters, to remove solids from a salt solution prior to treatment in the cells of the apparatus 400.

Electrical power generating components and/or desalinization components of the apparatus 400 may be disposed in the space defined by the top and bottom manifolds 402, 408, and the casing components 424. In some examples, the power generating components and/or desalinization components of the apparatus 400 may include one or more electrode sets 410, each set 410 comprising a cathode side 512 (see FIG. 5) of an electrode 409, a first compartment 418 (e.g., comprising a relatively low electrolyte concentration, such as fresh water), one or more membranes 414, a second compartment 420 (e.g., comprising a higher electrolyte concentration than that of the first compartment, such as salt water), and an anode side 516 (see FIG. 5) of the electrode 409.

As mentioned above in reference to FIGS. 2, 3A, and 3B, electrode sets 410 may be connected together. For example, when multiple electrode sets 410 are connected in parallel, both sides of a single electrode 409 may comprise a cathode side 512 or an anode side 516 (see FIG. 5). Electrode pairs within a cell may be connected in parallel to increase the current and the multiple cells are connected in series to increase the voltage.

The electrodes 409 may have any suitable size, shape, and geometry and be manufactured using any suitable materials, such as metals and metal alloys (including, but not limited, to stainless steel, grade 2 Ti, Ni Alloys, Cu), ceramics, and/or composite materials. For example, the electrodes 409 may have a planar or plate-like configuration. In some embodiments, the electrodes 409 may have a mesh-like configuration to increase surface area. For example, increased surface area may increase the amount of anode and cathode materials for driving the current. Thus, increased surface area may facilitate power generation and/or desalination/treatment of water. In some embodiments, the electrodes may be manufactured using stainless steel (e.g., 316 stainless steel or grade 2 Ti).

Each side of the electrode 409 may include a coating. In some embodiments, a first side of the electrode 409 may include a silver coating (Ag), and a second side of the electrode 409 may include another coating, such as silver chloride (AgCl). By coating one side of an electrode 409 with the materials needed for the cathode (AgCl) and coating the other side of the electrode for materials needed for the anode (Ag), the overall volume of the apparatus 400 and materials needed may be reduced, and thereby the manufacturing cost may be reduced. The coatings may extend over all or portions of the electrode 409 in any suitable manner. For example, the coating on the electrode 409 may have a pattern or may cover a portion of the electrode. The coating may have various features, such as varying degrees of thickness.

During use and/or at a time when the apparatus 400 is not in use, one or more of the electrodes 409 may be removed from the apparatus 400 and cleaned, re-coated, and or replaced. For example, multiple electrode sets 410 may be disposed in a removable cartridge. (See also FIGS. 11A-11B, discussed below.) A cartridge based system may allow for removal of the anodes and/or cathodes, e.g., once the electrodes (or electrode materials) are degraded. In some embodiments, for example, the apparatus may comprise from 500 cells to 1500 cells each containing 400 to 750 electrode pairs. One cartridge may represent one cell, e.g., including the electrodes present in one cell (e.g. 400-750 anodes). Each cartridge may include suitable handles or grips to facilitate removal by an operator. For example, one cartridge may include two handles attached to one piece of metal coupled to all 400-750 anodes, wherein the anodes may be insulated from the metal via an insulator that is non-conductive (e.g. G10 electrical grade insulation). A cartridge-based apparatus comprising 500-1500 cells (and 500-1500 cartridges) may allow an operator to remove/replace one cell at a time, e.g., providing for continuous operation of the system, and/or may provide for exchanging all of the cells at once.

Figure 5:
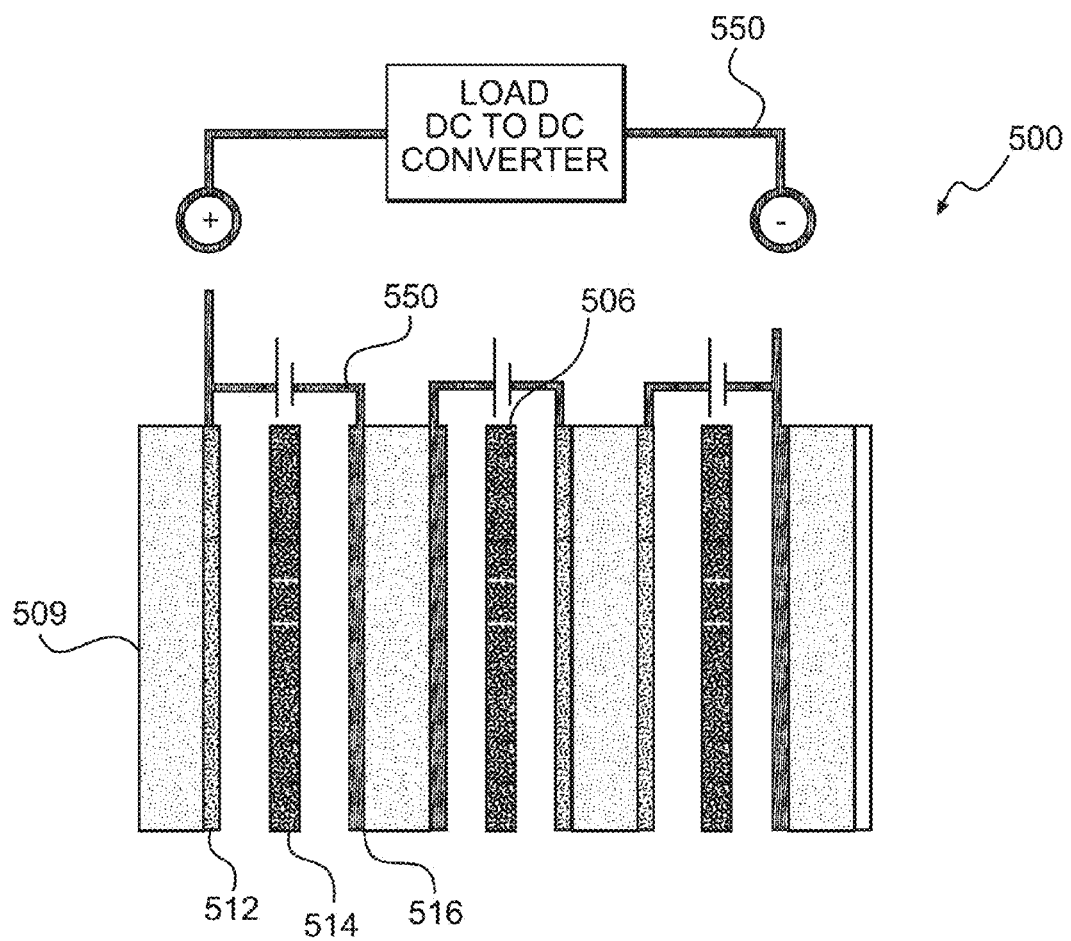
FIG. 5 is a schematic diagram of an exemplary three-pair electrode system, according to one or more embodiments of the present disclosure.

Each side of the electrode 409 may be connected to another side of an electrode 409 to complete an electrical circuit, via a wire 550 or other suitable electrical conductor, for example as shown in FIG. 5 and discussed below. In some examples, silver and silver chloride may be plated onto metal plates (e.g., comprising 316 stainless steel plates, and/or grade 2 Ti, among other suitable materials) to make the electrodes.

The first compartment 418 may be between the cathode side 512 of the electrode 409 and one or more membranes 414. In some embodiments, the first compartment 418 may be defined by the space between the cathode side 512 of the electrode 409 and a side of the membrane 414, e.g., the first compartment 418 not including an additional structural components. In some embodiments, the first compartment may contain a mesh spacer between the membrane, the electrolyte, and the anode, e.g., to reduce the amount of space between the electrodes. For example, a mesh spacer may reduce the resistance, increase the power, and/or increase the desalinization capability of the system. In other aspects, the first compartment 418 may include one or more surfaces between the top manifold 402, the bottom manifold 408, a side of the electrode 409, a side of the one or more membranes 414, and/or an inner surface of the casing 424.

The first compartment 418 may have any suitable size, shape, and geometry. For example, the first compartment 418 may have the same shape and/or size as the electrode 409. A portion of the first compartment 418 may be in fluid communication with the fluid inlets 404 of the top manifold 402 and/or another portion of the first compartment 418 may be in fluid communication with a drainage portion of the bottom manifold 408. The first compartment 418 may be manufactured using any suitable materials such as glass, plastic (including, e.g., polymers such as ABS and/or PVC), ceramic, and or metal. The first compartment 418 also may include various features including one or more filters, a stirrer or other water agitation device, (e.g. pump and/or water).

The apparatus 400 may be configured to control the flow of fluid therethrough. For example, the apparatus 400 may include one or more fluid conduits (e.g. pipes, hoses, etc.)

and/or one or more valves, compressors, shunts, and/or suction hoses, which may be configured to control fluid flow (e.g., flow of aqueous solutions, such as aqueous sodium chloride solutions), and/or pressure, pH, salinity, and/or conductivity. The fluid flow and/or fluid pressure may be electronically controlled by a control unit (alternatively referred to herein as a controller) in the apparatus 400.

The membrane 414 may be disposed between the first compartment 418 and the second compartment 420. The membrane 414 may have any suitable size, shape, and geometry. In some aspects, the membrane 414 may have a similar size and shape as the first compartment 418 and/or the second compartment 420. The membrane 414 may be manufactured using any suitable materials and may be manufactured in any suitable manner, for example, the membrane 414 may include a high temperature glass material including silica and boron trioxide (e.g., VYCOR) and/or polymer(s). The membrane 414 may include any suitable surface properties such as coatings, protrusions, varying thickness and/or porosity, and visualization features (e.g., colors, tints, and/or identifying symbols).

The membrane 414 may be semipermeable and may be configured to selectively allow the passage of $Cl^-$ and $Na^+$ ions and thereby act as a salt bridge between the cathode and anode sides of the electrode 409. The membrane 414 may be removable from the apparatus 400. The membrane 414 may be sealed (e.g. water tight sealants such as Loctite epoxy and/or auto/marine sealant with 100% RTV silicone) that are non-conductive and are located between the top manifold 402 and the bottom manifold 408 to prevent migration of the solutions between the first compartment 418 and the second compartment 420 by any pathway other than diffusion across the membrane 414.

The second compartment 420 may be disposed between the anode side of the electrode 409 and the membrane 414 and may have similar features to the first compartment 418 described above. In some aspects, the second compartment 420 may be defined by the space between the anode side of the electrode 409 and a side of the membrane 414, e.g., the second compartment 420 not including any additional structural components. In some embodiments, the second compartment may contain a mesh spacer between the membrane, the electrolyte, and the electrode, e.g., to reduce the amount of space between the electrodes as in the first compartment 418 discussed above. In other aspects, the second compartment 420 may include one or more surfaces between the top manifold 402, the bottom manifold 408, a side of the electrode 409, a side of the membrane 414, and/or an inner surface of the casing 424.

The second compartment 420 may have any suitable size, shape, and geometry. In some embodiments, the second compartment 420 may have substantially the same shape and/or size as the electrode 409. A portion of the second component 420 may be in fluid communication with the fluid inlet portion 404 of the top manifold 402 and/or another portion of the second compartment 420 may be in fluid communication with a drainage portion of the bottom manifold 408.

As mentioned above, the apparatus 400 may include multiple electrode sets 410 placed in any suitable electrical circuit configuration, for example, in series or in parallel, to generate electrical power. In some aspects, the electrode sets 410 may be arranged in a grid configuration, such that all electrode sets 410 (or a portion thereof) may be used based on the amount of electrical power or volume of desalinated water that is desired. For example, the apparatus may have 100 sets of electrodes 410, each generating about 1.0 V of power, and the user may select, e.g., 10 electrode sets be used to generate 10 V of power. Different portions of the electrode sets 410 may be connected to different electrical outlet ports in the top manifold 402, or may be connected to the same outlet port. For example, 10 electrode sets 410 may output power to a single outlet port. In some embodiments, all of the electrode sets 410 may output power to all of the outlet ports. Components of the apparatus 400 may be manufactured in any suitable manner for example, using molding techniques, and/or 3-D printing using one or more plastics, e.g. ABS-M30 (acrylonitrile butadiene styrene-ISO).

The apparatus 400 may be configured to allow multiple types of flows therethrough: e.g., energy, fluid, and/or ions. The energy generated by the electrode sets 410 may flow out of the apparatus 400 from the top manifold 402 to deliver power via one or more outlets. The desalinated water produced by the electrode sets 410 may flow out of the apparatus 400 from the bottom manifold 408 to deliver desalinated water via one or more outlets. An example of the flow and potential difference that may be generated by an electrode pair of the apparatus 400 is shown in FIG. 1, described above.

FIG. 5 shows a schematic circuit diagram 500 of an exemplary apparatus for generating electrical power and producing desalinated water, such as apparatus 400. The circuit 500 may include multiple electrode sets 510. Each electrode 509 in an electrode set 510 may include a cathode side 512 and an anode side 516. The electrode set 510 also may include a membrane 514 between the anode side 516 and the cathode side 512. The anode side 516 and cathode side 512 may be plated on a surface of the electrode 509. A conduit 550, such as a metal wire may connect the cathode side 512 and anode side 516 of the electrode 509.

Figure 6:
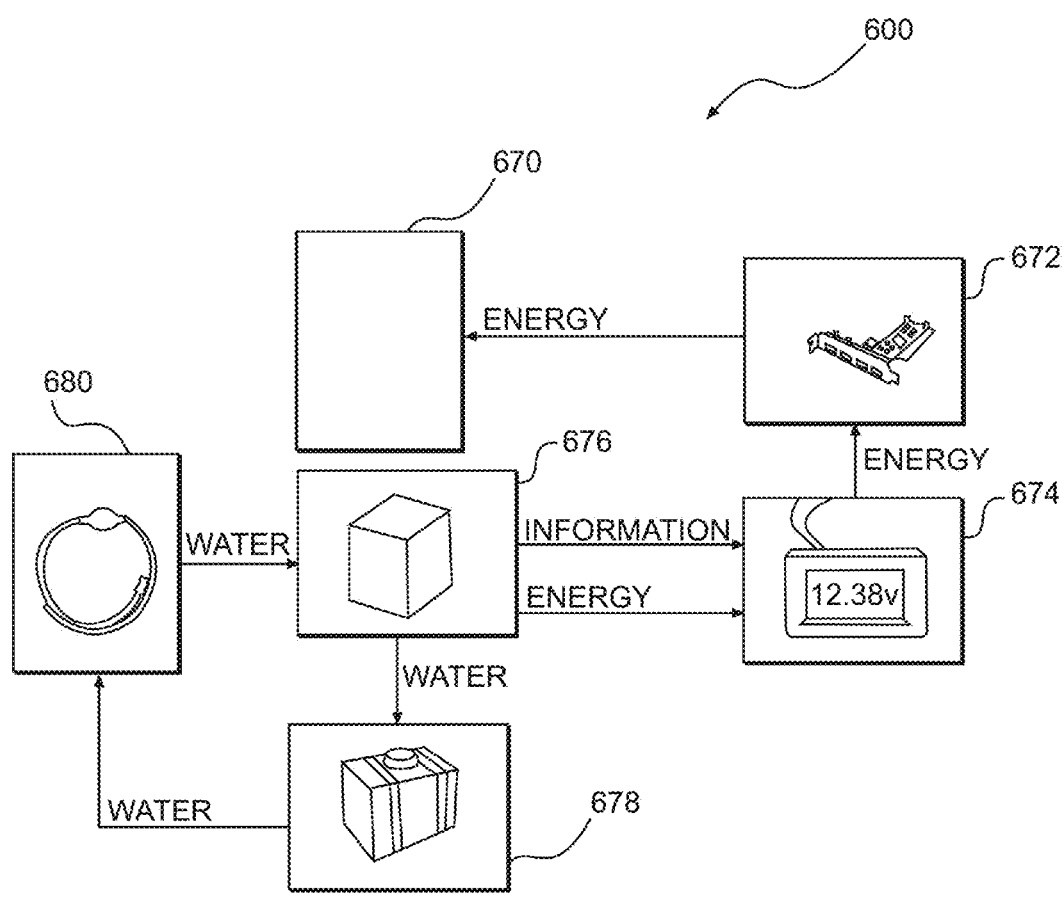
FIG. 6 is a flow diagram of a system by which an electronic device may be electrically powered by an electrical power-generating apparatus, according to one or more embodiments of the present disclosure.

FIG. 6 shows a flow diagram of a system 600 by which an electronic device may be electrically powered by an electrical power generating apparatus, such as apparatus 400. The system 600 may allow current to flow through one or more conduits (e.g. wires) from the power generating apparatus 676 to a control unit 674 and on to one or more ports 672, such as USB port(s) to which an electronic device 670 may connect and draw electrical power. The power generating apparatus 676 may receive water from one or more water tanks 678 via various components, such as one or more tubes, filters, and/or pumps 680. In addition, the power generating apparatus 676 may send information through wired or wireless communication, such as via a network (e.g. the Internet) to the control unit 674 for processing. In some embodiments, the power generating apparatus 676 may measure fluid levels and characteristics (e.g. salt concentration, pH, and/or pressure) via one or more sensors, and may send this information to the control unit 674 for processing. The control unit 674 (or controller) may then send information and or programming instructions to modify the amount of fluid and/or pressure to be delivered or drained from the apparatus 676.

Figure 7:
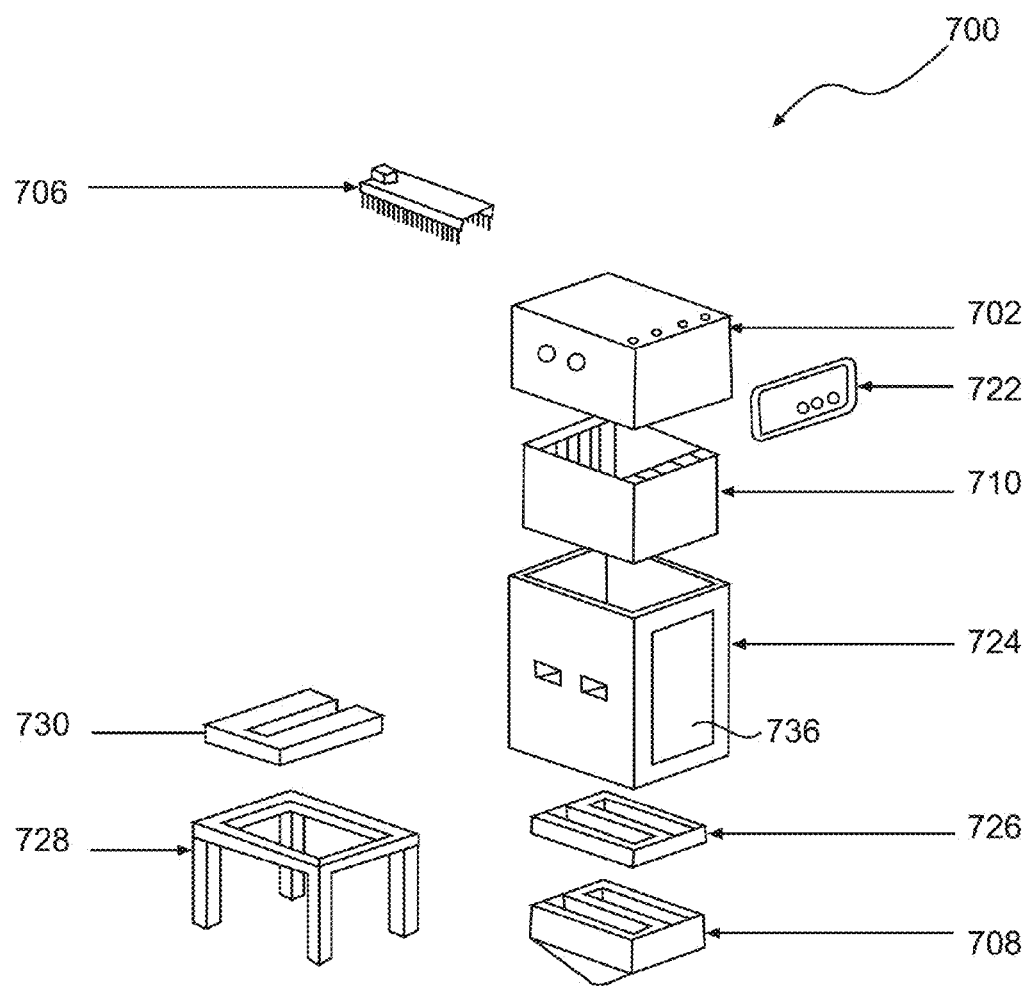
FIG. 7 is an exploded view of an exemplary apparatus, according to one or more embodiments of the present disclosure.
Figure 8:
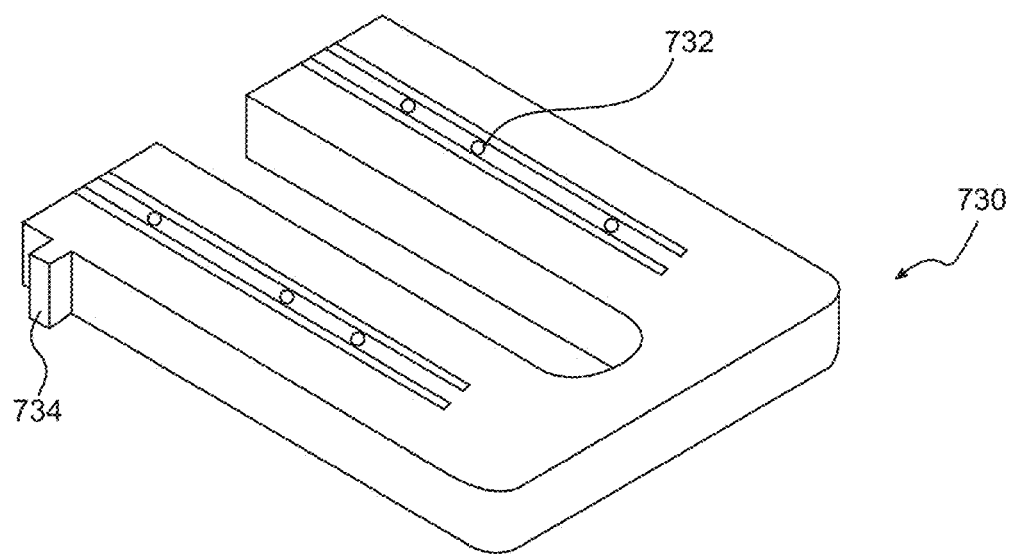
FIG. 8 is a perspective view of an exemplary drainage slide of an apparatus, according to one or more embodiments of the present disclosure.

FIG. 7 is an exploded view of an exemplary apparatus 700 for generating electrical power and/or desalinization of salt water, which may include any of the features of apparatus 400 shown in FIG. 4. The apparatus 700 may include a cell casing 724 having a casing window 736. The casing window 736 may be configured to allow visualization of the internal components of the apparatus 700, for example, casing window 736 may be manufactured using a transparent material (e.g. glass or plastic). The apparatus 700 also may include a top manifold 702 having electrical components 706 and a display 722, a bottom manifold 708, and an electrode set 710 including electrodes, a first compartment (e.g., comprising fresh water), a second compartment (e.g., comprising salt water), and membranes as described above. In addition, the apparatus 700 may include exit outlets from each of the first and second compartments in fluid communication with the bottom manifold 708, which may include a filter compartment 726 for housing one or more filters. In addition, the bottom manifold may include a movable drainage slide 730, shown in FIG. 8.

The drainage slide 730 may be in fluid communication with the bottom manifold 708, and may be configured to drain these fluids. The drainage slide 730 may include holes 732, which may correspond to holes in the bottom manifold 708. For example, the drainage slide may include six holes 732 (e.g. two holes for each set of three water compartments) that maybe axially aligned with six holes in the bottom manifold 708.

The drainage slide 730 with holes 732, may have two effluent streams per cell (e.g., effluent stream 1 and/or effluent stream 2). Effluent stream 1 may be generated from salt water that enters the anode side of the cell. Effluent stream 1 may be discharged through bottom manifold 708 and drainage slide 730 as fresh water. The fresh water discharged from the cell in this manner may be sent for storage or use. Effluent stream 2 may be generated from the fresh water that enters the cathode side of the cell. Effluent stream 2 may be discharged through bottom manifold 708 and drainage slide 730 as fresh water. Effluent stream 2 may be kept independent of effluent stream 1 and may be discharged to storage tank 678 and recirculated through the system via pump 680, or effluent stream 2 may be discharged for storage or use in a similar manner as effluent stream 1.

The drainage slide 730 also may include a tab 734 configured to correspond with a slot in the bottom manifold 708. The tab 734 may be configured to allow the slide 730 to selectively move, and may ensure that the slide 730 is not inadvertently completely removed. A filter may be disposed inside a tube leading from the slide 730 to the bottom manifold 708 to filter the fluid. The apparatus 700 also may include a removable stand 728 having legs for maintaining the apparatus 700 in an upright position. The stand may include wheels (including, e.g., lockable wheels), rollers, and/or sliders. The height of the stand 728 may be adjusted and the stand 728 may be removable from the apparatus 700.

Figure 9:
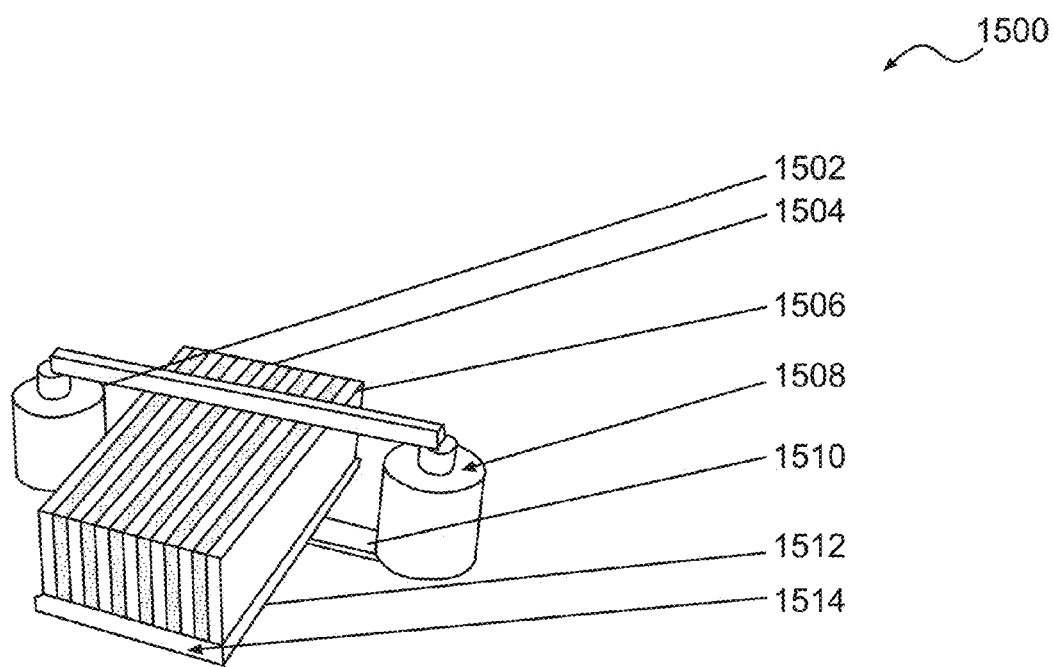
FIG. 9 shows an exemplary apparatus, according to one or more embodiments of the present disclosure.
Figure 10:
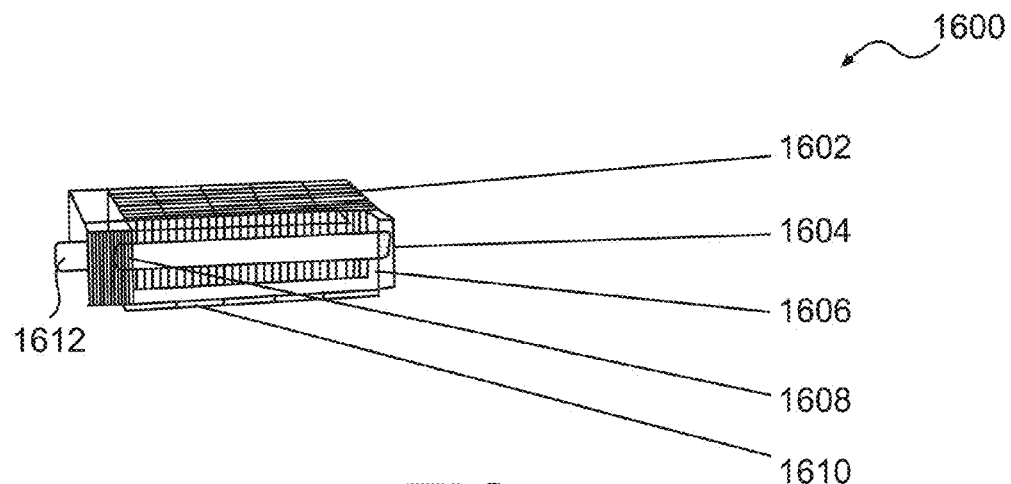
FIG. 10 shows an exemplary apparatus, according to one or more embodiments of the present disclosure.

FIGS. 9 and 10 each show examples of apparatuses 1500 and 1600 similar to the apparatus 400 shown in FIG. 4 and described above. In either or both of these exemplary apparatus configurations 1500, 1600, salt water and fresh water may be continuously pumped through the electrode sets to increase power output and/or volume of desalinated water produced. Salt (e.g., NaCl) may be added to the anode solution over time in order to keep the molarity within a desired threshold or to maintain a desired concentration, such as within a range from about 0.02 M to about 3.0 M, or from about 0.5 M to about 1.0 M, or to keep the molarity one to four orders of magnitude greater than the concentration of the aqueous solution on the cathode side (e.g., which may have a concentration ranging from about 0.003 M to about 0.1 M).

Apparatuses 1500 and/or 1600 may include any of the features of apparatuses 400 and/or 700 discussed above. The apparatus 1500 shown in FIG. 9 may include one or more first containers 1502 (e.g., comprising fresh water), one or more sets of electrodes, anode 1504 and cathode 1506, one or more second containers 1508 (e.g., comprising salt water), and one or more pumps 1510 configured to continuously deliver water to the electrodes 1504 and 1506. The apparatus 1500 also may include one or more filters 1512 and a collector 1514 configured to collect fluid, which may be re-used by the apparatus 1500.

The apparatus 1600 shown in FIG. 10 may include one or more electrode sets 1602, a first inlet 1604 for receiving salt water from a salt water generator 1606 (e.g. an intake systems with filtering and storage capability), a second inlet 1612 configured to receive fresh water (e.g. from a natural source, feed source or storage container), and a collector 1610 configured to collect, transport or drain fluid. The apparatus 1600 also may include a filter 1608 for filtering water. The inlets 1604, 1612 may be connected to a source of water (e.g. faucet, hose, or water tank).

Figure 11A:
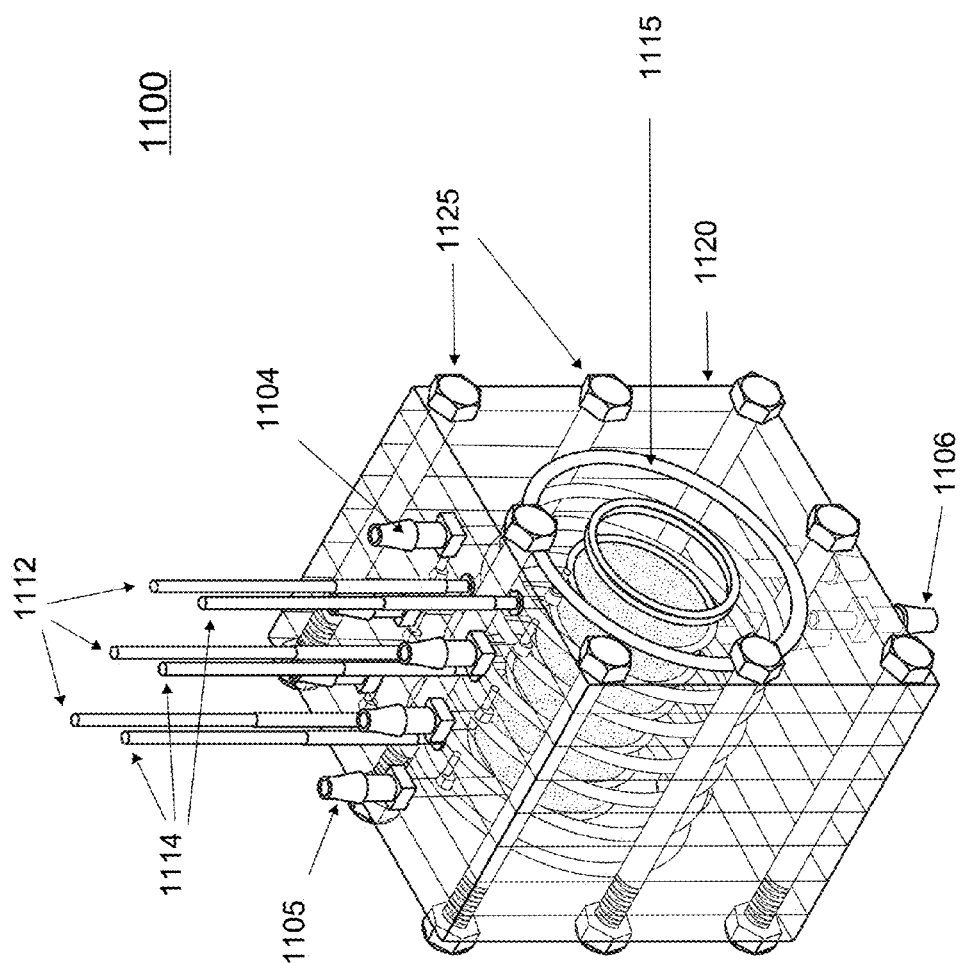
Figure 11B:
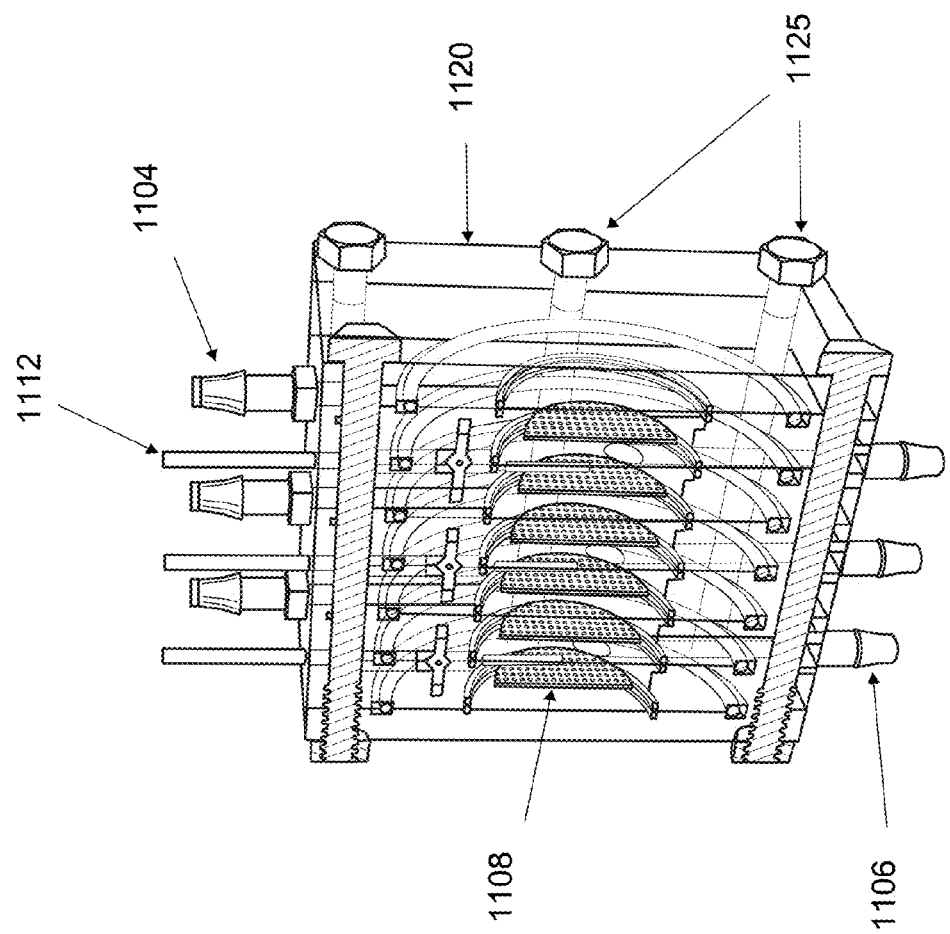

Another exemplary apparatus 1100 according to the present disclosure comprising multiple cells is shown in FIGS. 11A and 11B. Apparatus 1100 may include any of the features of apparatuses 400, 700, 1500, and/or 1600 discussed above. Each cell of the apparatus 1100 may include at least one electrode pair comprising an anode and a cathode, as discussed above, separated by a membrane 1108 (see cross-sectional view in FIG. 11B; anode and cathode not explicitly shown). Each anode may be electrically coupled to an anode lead 1112, and each cathode may be electrically coupled to a cathode lead 1114. While the apparatus 1100 is shown as including five electrode pairs (e.g., five cells, each cell comprising one electrode pair), it is understood that more or fewer cells are possible and encompassed by the present disclosure.

The apparatus 1100 also may include a plurality of first inlets 1104 for receiving salt water, a plurality of second inlets 1105 for receiving recirculated fresh water, and a plurality of outlets 1106 through which treated water may exit the apparatus 1100. The second inlets 1105 may comprise a recirculating loop of fresh water, whereas the first inlets 1104 may be in communication with the outlets 1106, e.g., such that the incoming salt water may exit the apparatus 1100 with a reduced concentration of salt (i.e., as fresh water or desalinated water).

As shown, the apparatus 1100 includes a casing 1120, which may be configured to allow for the stacking of multiple cartridges, each cartridge comprising one cell. Gaskets 1115 may separate the different cartridges/cells from each other. In order to remove an individual cartridge (e.g., for repair and/or for replacement with a new cell), supporting rods 1125 may be individually and temporarily removed from the casing 1120 to access individual cartridges. Upon replacing the cartridge, the rods 1125 may be replaced.

An apparatus 1100 according to FIGS. 11A-11B may comprise any suitable number of electrode pairs per cell. In some embodiments, for example, each cell may comprise from 1 to 1000 electrode pairs, such as from 5 to 10, from 10 to 50, from 50 to 100, from 250 to 750, from 500 to 800, from 600 to 700, from 100 to 250, or from 150 to 200 electrode pairs. In some embodiments, each cell may comprise 5, 50, 100, 250, 400, 500, 600, 650, 660, 750, 800, or 1000 electrode pairs. In some embodiments, the apparatus 1100 may comprise from 500 cells to 1500 cells, each cell containing from 400 to 750 electrode pairs.

The apparatus 1100 further may comprise any suitable number of cells per cartridge, and any suitable number of cartridges in total. For example, each cartridge may comprise 1, 2, 3, 4, 5, 6, 7, 8, 9, or 10 or more cells. In some embodiments, the apparatus 1100 may comprise 1, 2, 3, 4, 5, 6, 7, 8, 9, or 10 or more cells (e.g., the apparatus 1100 comprising 1, 2, 3, 4, 5, 6, 7, 8, 9, or 10 or more cartridges).

Each cartridge may be individually removable from the apparatus 1100 as discussed above.

Any of the features of a particular embodiment disclosed herein may be combined with any other features of any of the other embodiments. As one example, apparatuses 1100, 1500, and/or 1600 may include any of the features of apparatus 400 and/or 700, and vice versa. As another example, apparatuses 700, 1100, 1500, 1600 may comprise any of the components of apparatus 400 and/or similar components formed of similar materials.

As mentioned above, the systems and apparatuses (e.g., apparatuses 400, 700, 1100, 1500, and/or 1600) according to the present disclosure may be used in water treatment, e.g., water desalination or purification. For example, the apparatuses may act as a purifying system (e.g., by removing $Cl^-$ ions and/or other ions from solution). Each apparatus may have any suitable size, and the size may be adjusted based on the desired use, such as the amount of power output desired. For example, calculations based on a 1:1 scale of combining an exemplary 2 inch×2 inch×2 inch apparatus comprising electrode pairs connected in parallel and cells connected in series (see, e.g., FIGS. 3A and 3B), a device that is 5 feet×4 feet×4 feet may produce about 10,000 to 30,000 watts of power, and may produce about 4,000 to 10,000 gallons of treated water in a day.

In view of the disclosure herein (including the examples below), a person of ordinary skill in the art will be able to determine the appropriate number of electrode pairs, cells, and configuration of cells to achieve the desired power output and/or amount of desalinated water.

In some embodiments, for example, the apparatuses disclosed herein may generate from about 1,000 W to about 30,000 W of power, such as from about 1,500 W to about 25,000 W, from about 4,000 W to about 5,000 W, from about 10,000 W to about 30,000 W, from about 5,000 W to about 25,000 W, from about 8,000 W to about 15,000 W, or from about 10,000 W to about 15,000 W. An individual cell of the apparatuses disclosed herein may generate from about 100 mV to about 200 V of power, such as from about 150 mV to about 150 V, from about 200 mV to about 100 V, from about 225 mV to about 75 V, from about 240 mV to about 50 V, from about 250 mV to about 50 B, from about 300 mV to about 45 V, from about 350 mV to about 25 V, from about 500 mV to about 25 V, from about 550 mV to about 20 V, from about 600 mV to about 15 V, from about 750 mV to about 10 V, or from about 1 V to about 5 V of power.

Further, for example, the apparatuses disclosed herein may produce from about 1,000 g/day to about 30,000 g/day of treated water (e.g., desalinated water), such as from about 2,000 g/day to about 18,000 gal/day, from about 4,000 gal/day to about 5,000 gal/day, from about 5,000 gal/day to about 15,000 gal/day, from about 7,500 gal/day to about 12,500 gal/day, from about 10,000 gal/day to about 20,000 g/day, or from about 10,000 gal/day to about 15,000 gal/day. For example, the apparatus 1100 may produce from about 4,000 g/day to about 5,000 gal/day of desalinated water. Further, for example, the apparatus 1500 may produce from about 5,000 g/day to about 25,000 gal/day, or from about 10,000 g/day to about 20,000 gal/day of desalinated water. As mentioned above, the generation of power and desalination of water may be simultaneous.

During operation, a drop in voltage may indicate that the driving force for the reactions occurring at the anode and cathode surfaces has ceased (e.g., the system coming to equilibrium). The electrodes then may be switched, which may re-initiate the reaction, or the electrodes may be replaced, such as through a cartridge-based system described in connection to apparatus 400 of FIG. 4 and apparatus 1100 of FIGS. 11A and 11B. Thus, apparatuses according to the present disclosure may provide a renewable system. As a continuous amount of salt water is added to the electrode set, fresh water may be produced through circulation of the cathode solution through the filtration system. In addition, as a continuous amount of salt water is added to the electrode set, desalinated water may be produced through circulation of the anode solution through the apparatus.

Apparatuses according to the present disclosure may be configured to accommodate the desired flow rate of a given application, and may be configured with as many electrode pairs as deemed necessary for the given application. These electrode pairs may be configured in parallel and/or series in any combination that yields the desired volume of desalinated salt water and power. When used in any given application, the apparatus may be used as the sole technology used to desalinated salt water, or may be used in combination with other technologies (e.g., microfiltration, coagulation chemicals, sedimentation tanks, centrifuges, rotary presses, belt presses, etc.). The power generated from the apparatus when desalinating salt water in any given application may be used on-site (e.g., to power auxiliary equipment, lighting, or pumps, among other devices) or off-site (e.g., supplying power to nearby buildings, or providing power to a centralized grid).

As mentioned above, aspects of the present disclosure may be used to remove salt (e.g., NaCl) from salt water wastewater generated by industrial processes, including, but not limited to, fracking, manufacturing, reverse-osmosis, water softening, salt water aquifer drilling, groundwater treatment, salt water purification on various vessels, salt water runoff from mines, and salt water runoff from residential streets. Suitable applications for the systems and apparatuses disclosed herein also include desalinating salt water and/or generating power for residential use (e.g. residential homes, office buildings, remote urban towns, villages, cities/towns with access to a supply of salt water). When used to generate power in a residential application, the salt water may be synthetically created (e.g., NaCl added to water) to generate power.

EXAMPLES

The following examples are intended to illustrate the present disclosure without, however, being limiting in nature. It is understood that the present disclosure encompasses additional embodiments consistent with the foregoing description and following examples.

Example 1

AgCl electrodes were tested in salt solutions at various concentrations, in a "battery mode" and a "fuel cell mode." In battery mode, both solutions exposed to the anode and cathode are stagnant within the apparatus. In fuel cell mode, both solutions exposed to the anode and cathode flow via a hydraulic system. The latter fuel cell mode illustrates some aspects of apparatuses discussed above, e.g., first and second inlets 1104, 1105 and outlets 1106 of apparatus 1100, The solution exposed to the cathode flows through the cathode side of the apparatus and is recirculated via closed loop, and the solution exposed to the anode flows through the anode side of the apparatus continuously and may be recirculated for further desalination or discharged where desired.

Five experiments were conducted in which a solution having a low salt concentration of 0.006 M was maintained constant for the AgCl cathode, and the salt concentration of anode electrode solution was increased from 0.6 M to 3.0 M over the course of an hour and then to 6.0 M over the course of another hour. The voltage produced by the electrode configuration was measured using a GAMRY potentiostat device. The changes in electrolyte concentration were conducted to simulate the molarity increase the solution may undergo by natural evaporation of some of the water or varying supply water concentration. A saturated calomel reference electrode was used to measure changes in voltage and current.

The testing time was increased from one hour (see FIG. 12) to 18 hours (see FIG. 13) after the initial experiment. The 3.0 M and 6.0 M solutions were first conducted at a steady state and then the solutions were stirred (e.g. to simulate natural movement or hydraulic flow using a stirring plate). These tests were done using small electrodes for the purpose of optimizing the molarity needed to insure the three step process of the half-cell reaction, diffusion, and the concentration gradient would work in union. The results from these experiments are shown in Table 1.

TABLE 1

|  | Solutions Concentration | | | | |
| --- | --- | --- | --- | --- | --- |
|  | 0.6M | 3.0M | 3.0M (Stirred @125 RPMs) | 3.0M (Stirred @125 RPMs w/X2 Ag) | 6.0M |
| Voltage (mV) | 0.02533 | 0.3462 | 0.921 | 1.87 | 0.5699 |
| Current (nA) | 0.1309 | 3.265 | 75.92 | 143.7 | 5.982 |
| Charge Coulombs (µC) | 4.05 | 24.48 | 1908 | 3455 | 32.51 |
| Max Current (nA) | 0.1309 | 3.265 | 75.92 | 143.7 | 5.982 |
| Electrolyte Surface Area (in²) | 0.1239 | 0.1182 | 0.1734 | 0.3082 | 0.1295 |
| Current Density (nA/in²) | 1.056 | 27.62 | 473.83 | 466.26 | 46.19 |

Figure 12:
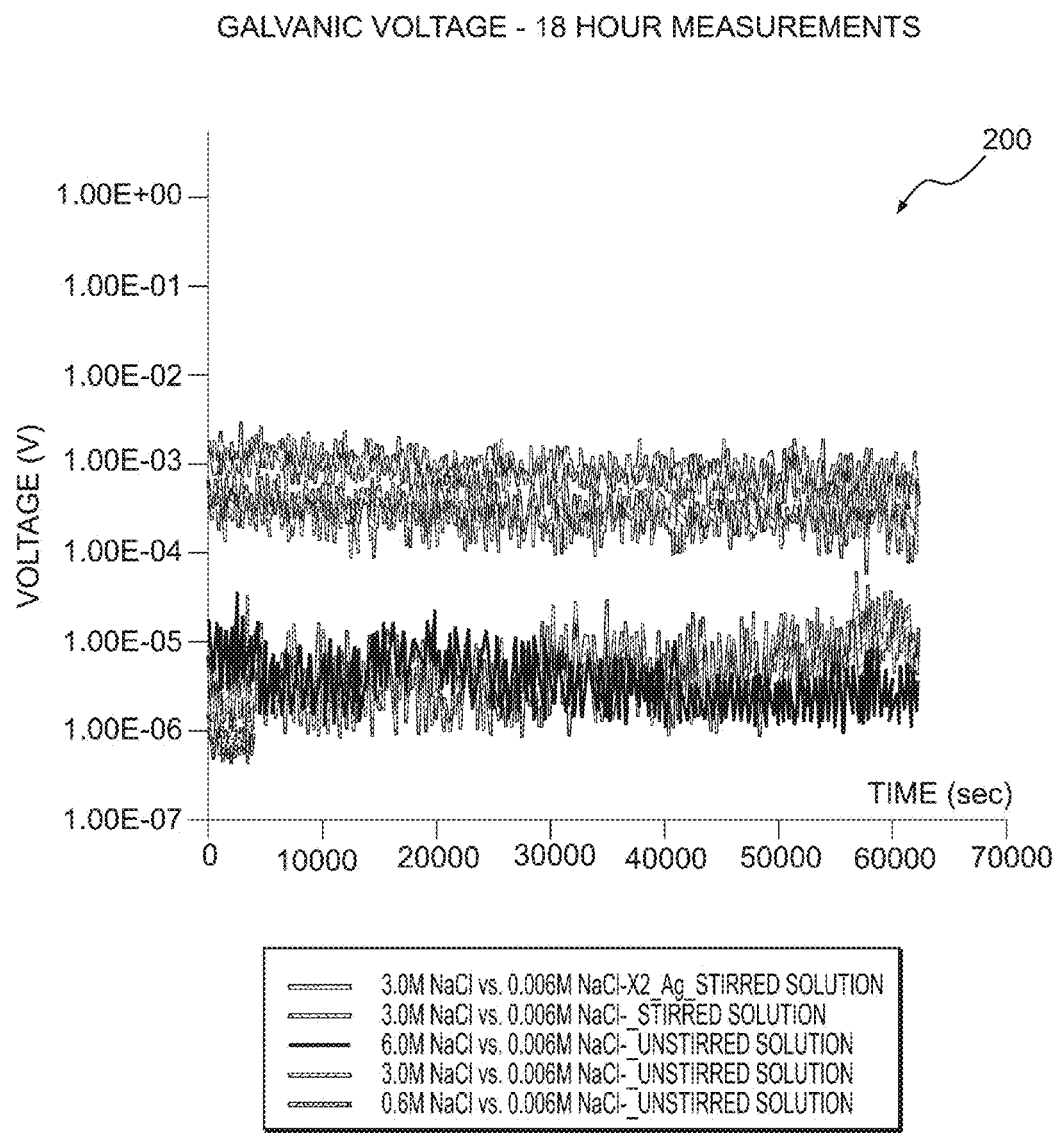
FIG. 12 shows a graph of voltage over time for various AgCl electrodes in NaCl solution, according to an example of the present disclosure.
Figure 13:
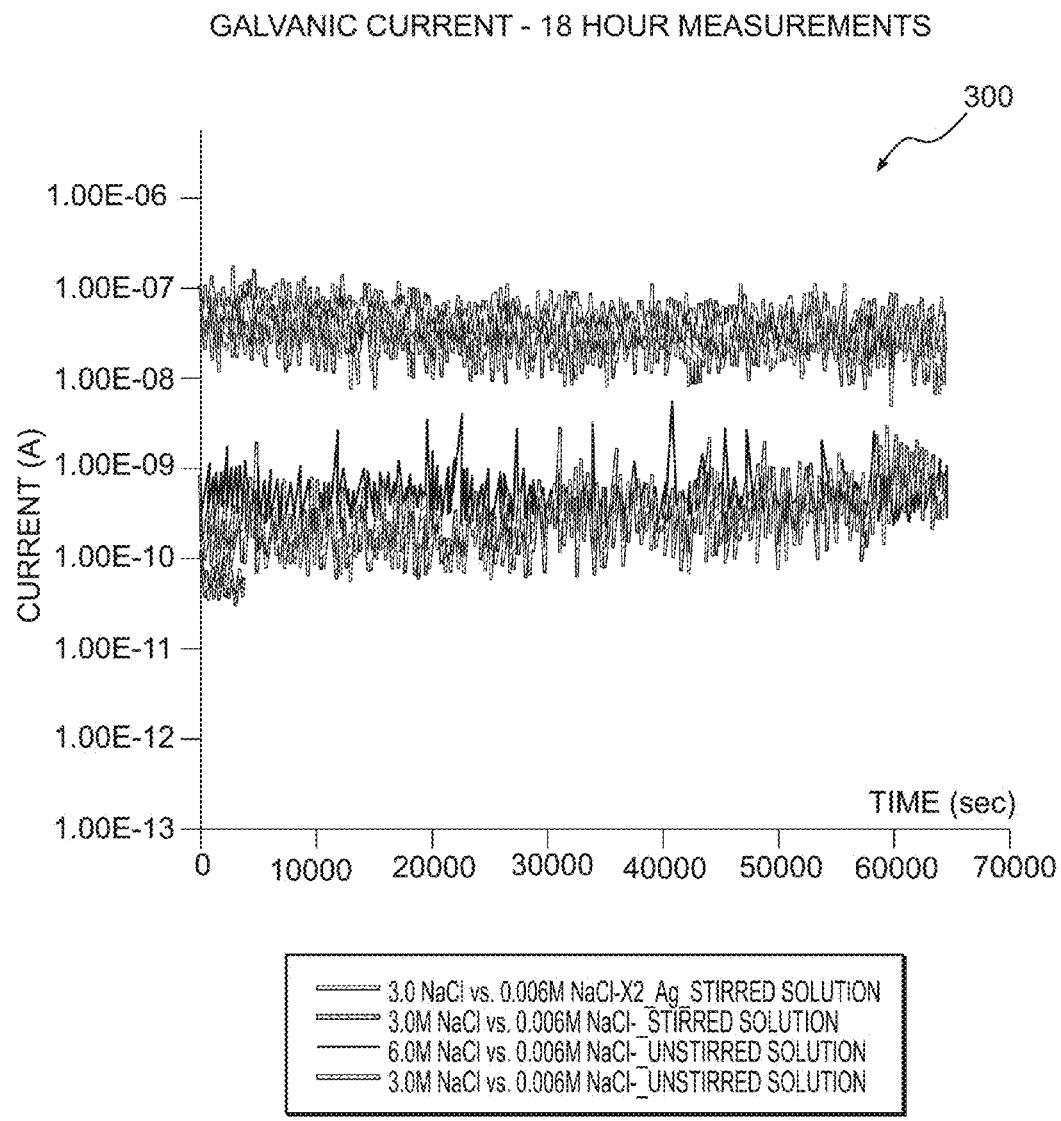
FIG. 13 shows a graph of voltage over time for various AgCl electrodes in NaCl solution, according to an example of the present disclosure.

The results measured by the potentiostat for the voltage and current are shown in FIGS. 12 and 13. FIG. 12 is a graph of galvanic voltage over time for various AgCl electrodes in NaCl solution displaying the differences between voltages while being run in a battery design (bottom horizontal line data sets starting at 1.00E-05) compared to being run in a fuel cell design (top horizontal line) at various concentrations ranging from 0.2 M to 6.0 M. FIG. 13 is a graph of galvanic current over time for various AgCl electrodes in NaCl solution displaying the differences between currents while being run in a battery design (bottom horizontal line data sets stating at 1.00E-10) compared to being run in a fuel cell design (top horizontal line) at various concentrations ranging from 0.2 M to 6.0 M.

From these results it was discovered that an anode solution having a salt concentration of about 3.0 M may improve overall results. Higher concentrations (e.g., about 6.0 M or greater) at or nearing saturation were more difficult to keep in solution, and may not result in a significant increase in voltage or current. It was also determined that by having the solutions in a non-steady state, both the current and voltage may increase by roughly three fold in magnitude. The temperature of the solutions was kept at 21° C. to simulate an environment of 70° F. or 294.15 K.

Computational methods were used to obtain theoretical data to compare the experimental data. Cell potentials were calculated using Nernst equation (Equation 3) below for the anode.

$$E = E_o + \frac{2.303RT}{nF} \log_{10}[Cl^-] \quad \text{Eq. 3}$$

The results of the calculations based on Equation 3 are shown in Table 2 below.

TABLE 2

|  | Anode Solution 1 | Anode Solution 2 | Anode Solution 3 |
| --- | --- | --- | --- |
| NaCl Concentration | 0.6M | 3.0M | 6.0M |
| E (mV$_{NHE}$) | 116.7 | 157.5 | 175.1 |

An example of the cathode calculation is shown in Equation 4:

$$E_{cathode} = 0.223 + \frac{2.303(8.314)(294.15)}{(1)(96485)} \log_{10}[0.006] = 93 \text{ mV}_{NHE} \quad \text{Eq. 4}$$

Mass gain on the Ag anode 102 was then calculated via Faraday's Law of Electrolysis (Equation 5) to determine the mass gain on the Ag anode 102 (the plating/reduction of Cl⁻ on the Ag electrode) as an indication of the energy created and how much Cl⁻ was taken out of the salt water from oxidation occurring at the anode.

$$m = \left(\frac{Q}{F}\right)\left(\frac{M}{z}\right) \quad \text{Eq. 5}$$

In this equation, (m) is the total mass gain in grams, (Q) is the total charge, (F) is Faraday's Constant (96485 c/mol), (M) is mol/g, and (Z) is the number of valence electrons. The mass gain measured is compared to the calculated mass gain shown in Table 3 below.

TABLE 3

|  | Solution Concentration | | | | |
| --- | --- | --- | --- | --- | --- |
|  | 0.6M | 3.0M | 3.0M Stirred | 3.0M Stirred w/X2 Ag | 6.0M |
| Calculated Mass Gain (g) | 0.0015 | 0.009 | 0.700 | 1.27 | 0.012 |
| Measured Mass Gain (g) | 0.001 | 0.010 | 0.050 | 1.12 | 0.010 |

This mass gain was measured for the Ag anode 102 used in the 3.0 M NaCl solution with stirred. The mass gain was measured by removing (e.g. using sand paper) some the chloride that was plated through reduction and weighing the shavings. The experimental data may not have aligned with the measured data for various reasons such as interference from an increased filming or passivation on the electrodes that could have inhibited the energy created, occurrence of $Ag_2O$ and $AgClO_3$ plating which may have inhibited the amount of $Cl^-$ that was able to undergo reduction and be plated on the Ag, and/or the solution resistance created by using large amounts of solution may have inhibited the movement of ions.

Figure 17:
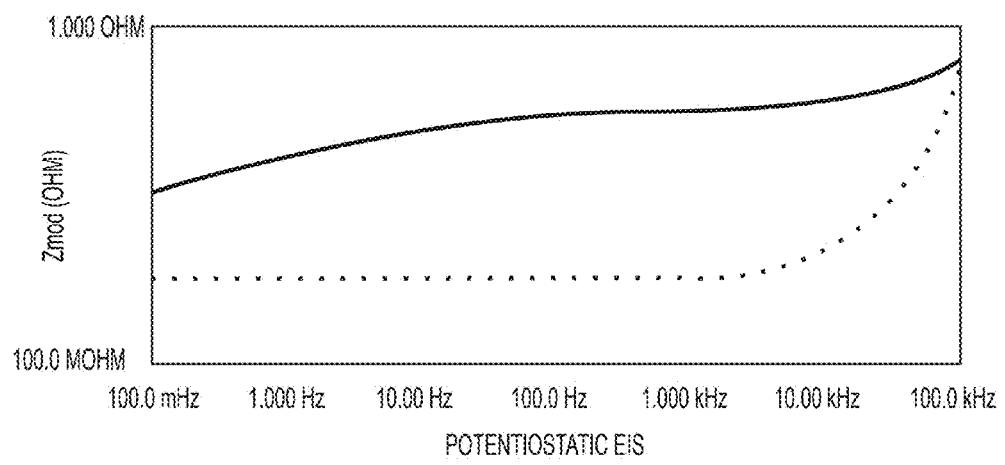
FIG. 17 is a graph of electrical frequency versus resistance, according to an example of the present disclosure.
Figure 18:
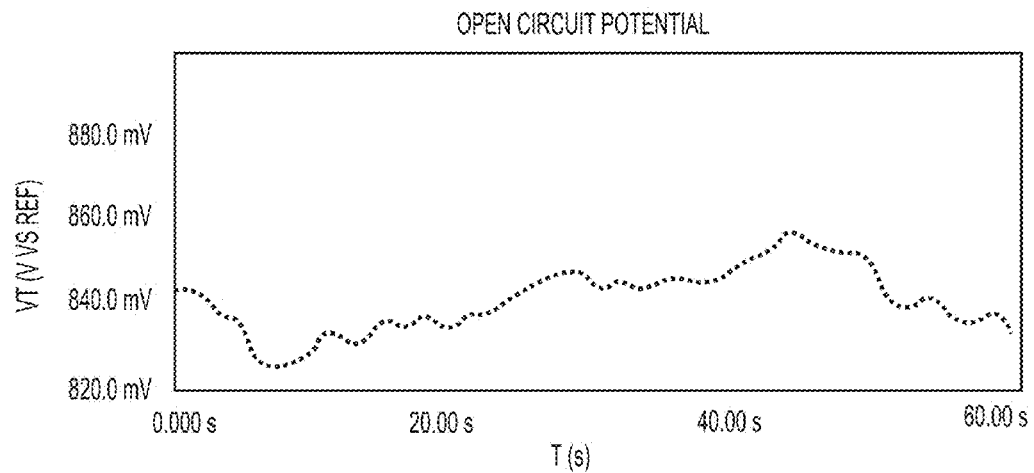
FIG. 18 is a graph of electrical potential over time, according to an example of the present disclosure.
Figure 19:
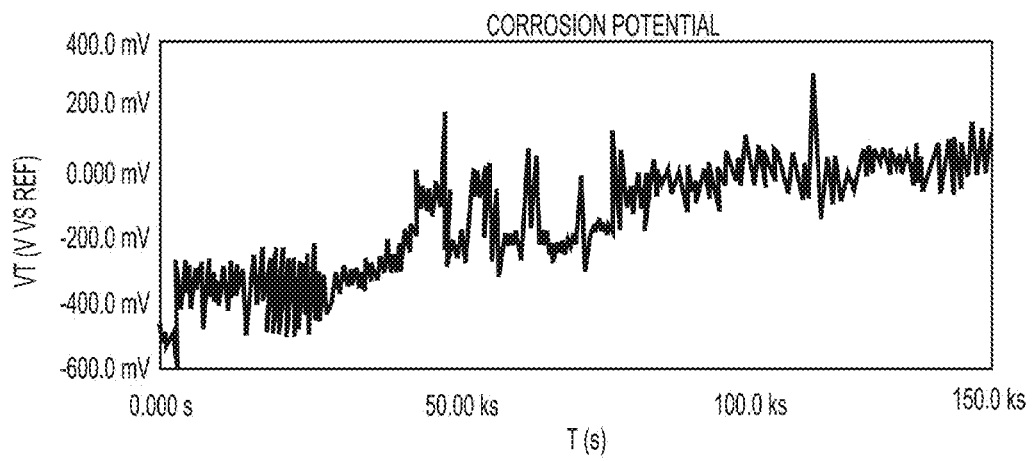
FIG. 19 is a graph of electrical potential over time, according to an example of the present disclosure.

FIGS. 17-19 use the same experimental set up as discussed above for FIGS. 12 and 13, with a saturated calomel reference electrode via a glassy carbon electrode using a GAMRY potentiostat. FIG. 17 shows a graph of frequency versus resistance. The highest frequency represents the resistance of each cell, which was found to be about 2.0Ω, indicating an overall resistance of the power generating apparatus of about 6.0Ω, but with the addition of the connections between each part the total resistance per electrode pair was found to be 8.96Ω. FIG. 18 shows testing of the cell over a period of 60 seconds, with the voltage of the open circuit cell with three electrode pairs measured at about 0.86 V. FIG. 19 shows the voltage of the open circuit cell after about 48 hours to determine the presence of a voltage reading near the end of the cycle of the cell and to determine if galvanic corrosion was the dominating reaction driving voltage. As shown, the cell held a constant increasing voltage after 48 hours and in addition, since the voltages changed from a negative connotation to a positive connotation, showed the possibility of the voltage coming from galvanic corrosion, indicating the driving voltage of the power generating apparatus may be created from the anode and cathode undergoing oxidation and reduction.

Example 2

Figure 14:
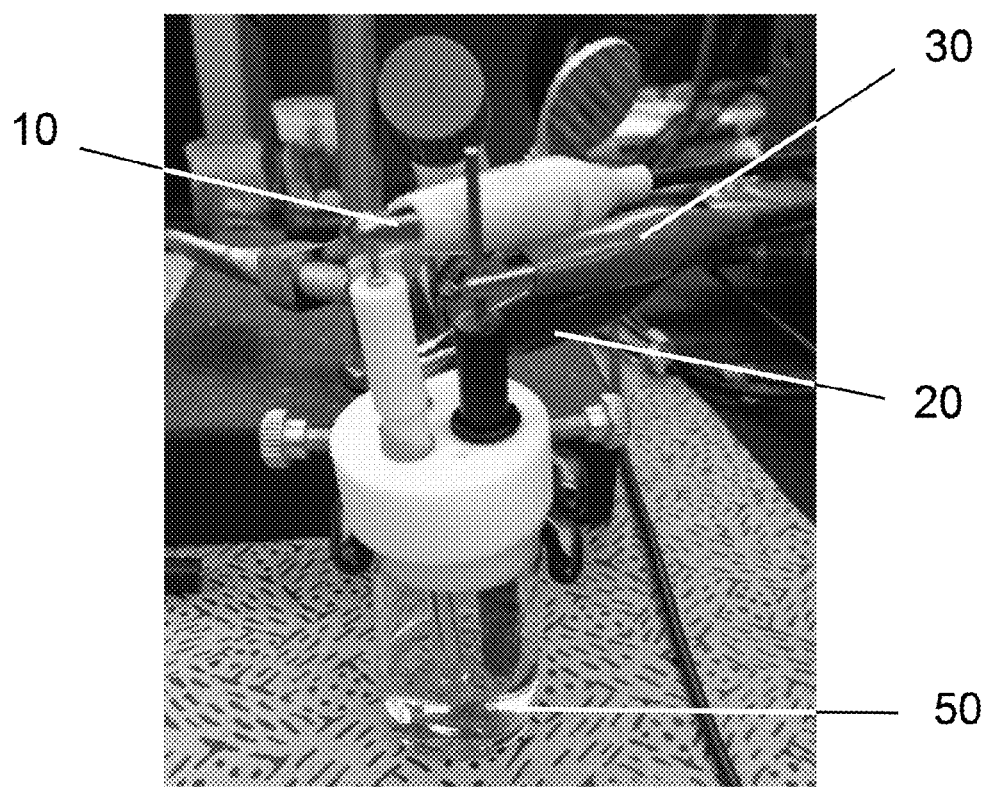
FIG. 14 is a photograph of an experimental setup comprising a glassy carbon reference electrode, according to an example of the present disclosure.
Figure 15A:
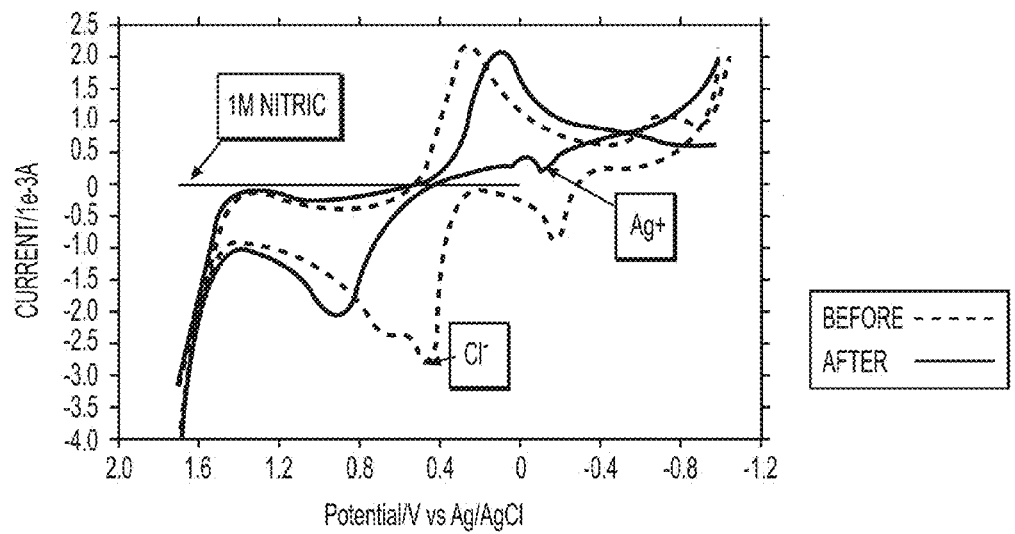
FIG. 15A is a graph of voltage versus current for anode electrode solutions, according to an example of the present disclosure.
Figure 15B:
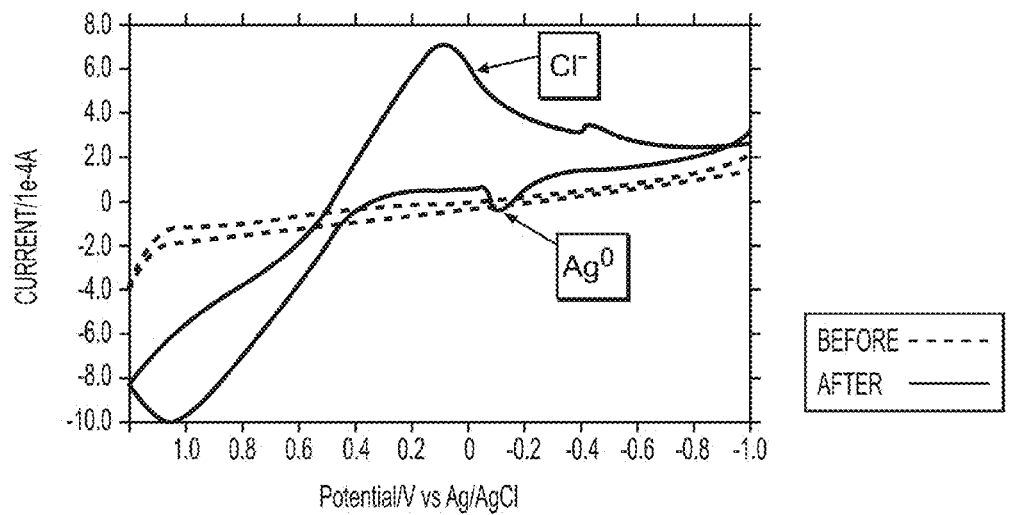
FIG. 15B is a graph of voltage versus current for cathode electrode solutions, according to an example of the present disclosure.
Figure 16:
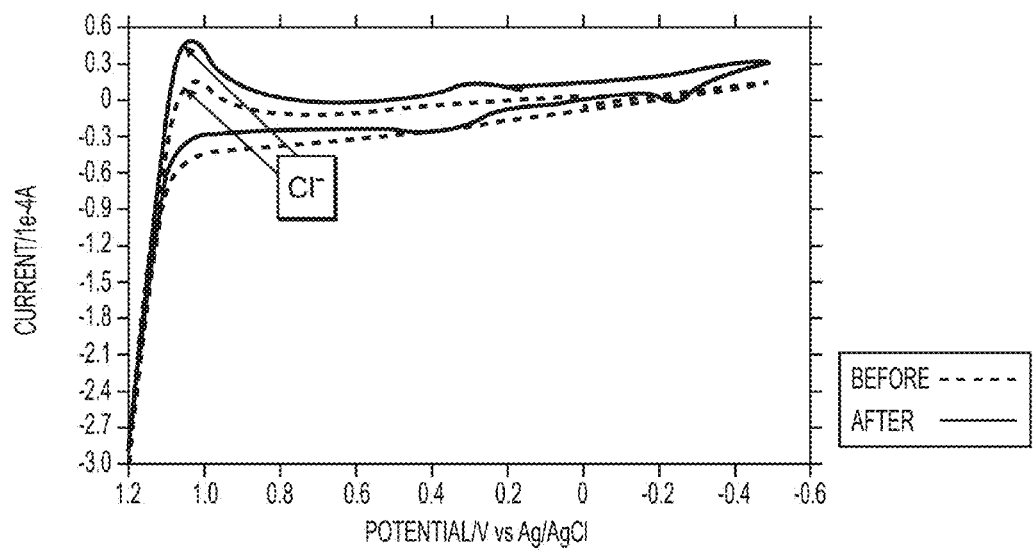
FIG. 16 is a graph of voltage versus current for anode electrode solutions, according to an example of the present disclosure.

FIG. 14 shows a one-electrode apparatus used to obtain the data shown in FIGS. 15A-15B and 16. The apparatus included a glassy carbon reference electrode 30 (e.g. reference lead) used with a slightly acidic solution having a pH of about 5.88 (pH 6.98 for cathode solution). The negative lead 10 (Ag electrode) was attached to a wire leading down into the solution 50. The negative lead 10 was surrounded by a semi-porous membrane. The positive lead 20 (AgCl electrode) to establish a predetermined open circuit potential relative to the solution 50 being analyzed. All or a portion of the leads 10, 20 may be attached to an analyzing system, such as the CH1720C Electrochemical Analyzer system. In order to minimize any influence on the results by any oxygen present in the solution, the glassy carbon electrode 30 was substituted with a 0.9999 platinum electrode (see discussion of FIGS. 15B and 16, below). This may provide potentials of the metals oxidizing on the surfaces of the electrodes not the value of oxygen oxidizing. To reduce the production of platinum oxide by the platinum (which may add 0.6V to the results), argon gas (mixed with water so as to reduce the occurrence of solution evaporation) was added as argon gas may reside on top of the solution 50 and may provide a barrier from the oxygen.

FIG. 15A is a cyclic voltammetry graph showing voltage versus current generated by the one-electrode apparatus of FIG. 14. The graph shows the presence of chloride and silver ions in the cathode solution before and after operation. The dip in the downward shaping parabola represents the chloride in the solution. The presence of silver ions in the solution is shown by a sharp increase from the downward shaping parabola. The straight line represents a 1 M nitric acid solution to show that the power generated by the apparatus was from the anode and cathode.

The voltage and current values in Table 4 were determined from the solution from the one electrode apparatus, and represent the highest theoretical voltage and current generated by the apparatus. The values in Table 4 indicate that a three-electrode apparatus may generate about 3.0 V, with 1.0 V from each electrode set. The measured voltage per cell is closer to 240 mV per cell, primarily due to the resistance created by the electrolytes, the membrane, and the wires used in the system.

TABLE 4

| Material | Voltage | Current | pH |
| --- | --- | --- | --- |
| Silver (Ag) | 0.2 V | 0.3 mA | 5.1 |
| Chloride (Cl–) | 1.0 V | 2.0 mA | 5.8 |

FIGS. 15B and 16 show an analysis of the cathode and anode solutions, respectively, of the apparatus depicted in FIG. 14. The electrode solutions were analyzed after the solution was used in the apparatus of FIG. 14 described above in which platinum was used. In FIG. 15B, the non-parabolic lines represent the cathode solution before use of the apparatus and the parabolic line represents the solution after use in the apparatus. The relatively large increase in the parabolic line represents a significant increase of chloride ions in the solution and current generated. To increase the amount of current, electroplating and self-passive electroplating can be used as a substitution for hot dipping the electrodes.

In FIG. 16 two sets of lines are shown, wherein the dashed line represents before the anode solution is used in the apparatus and the solid line after the anode solution is used in the apparatus. FIG. 16 shows that the anode removes some $Cl^-$ from aqueous solution. Before testing, both electrode solutions were degassed.

Example 3

FIG. 2 illustrates a set of experimental conditions for system comprising a AgCl cathode and an Ag anode. Each electrode had a surface area of 12.9 $cm^2$. The AgCl anode was placed in contact with a 0.006 M NaCl solution (0.35 g/L of NaCl), and the Ag cathode was placed in contact with a 3.0 M NaCl solution (175 g/L NaCl). The anode and cathode were separated by a membrane 1 mm thick, wherein the membrane allowed for the passage of solvated $Na^+$ and $Cl^-$ ions therethrough (0.629 g of $Na^+$ and $Cl^-$.

The anode and cathode were in electrical contact, providing for oxidation at the anode according to Equation 1 above, and reduction at the cathode according to Equation 2 above. The open cell potential was measured at 242 mV. The total resistance for the electrode pair was measured at 8.96Ω. The total current per electrode pair was measured at 0.027 A.

Example 4

Figure 20A:
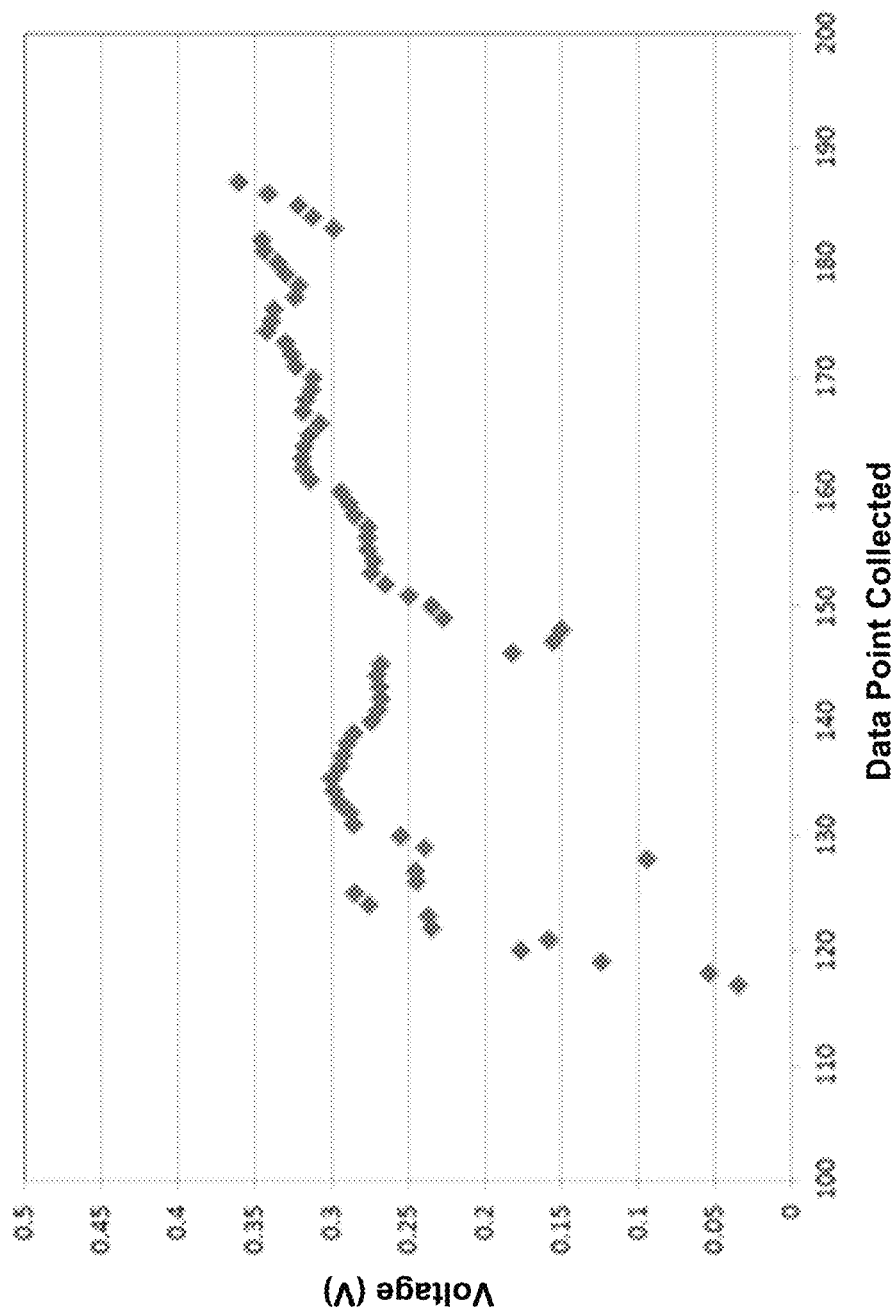
FIG. 20A shows a graph of open circuit potential (OCP) of one pair of electrodes not under a load of an apparatus, according to an example of the present disclosure.
Figure 20B:
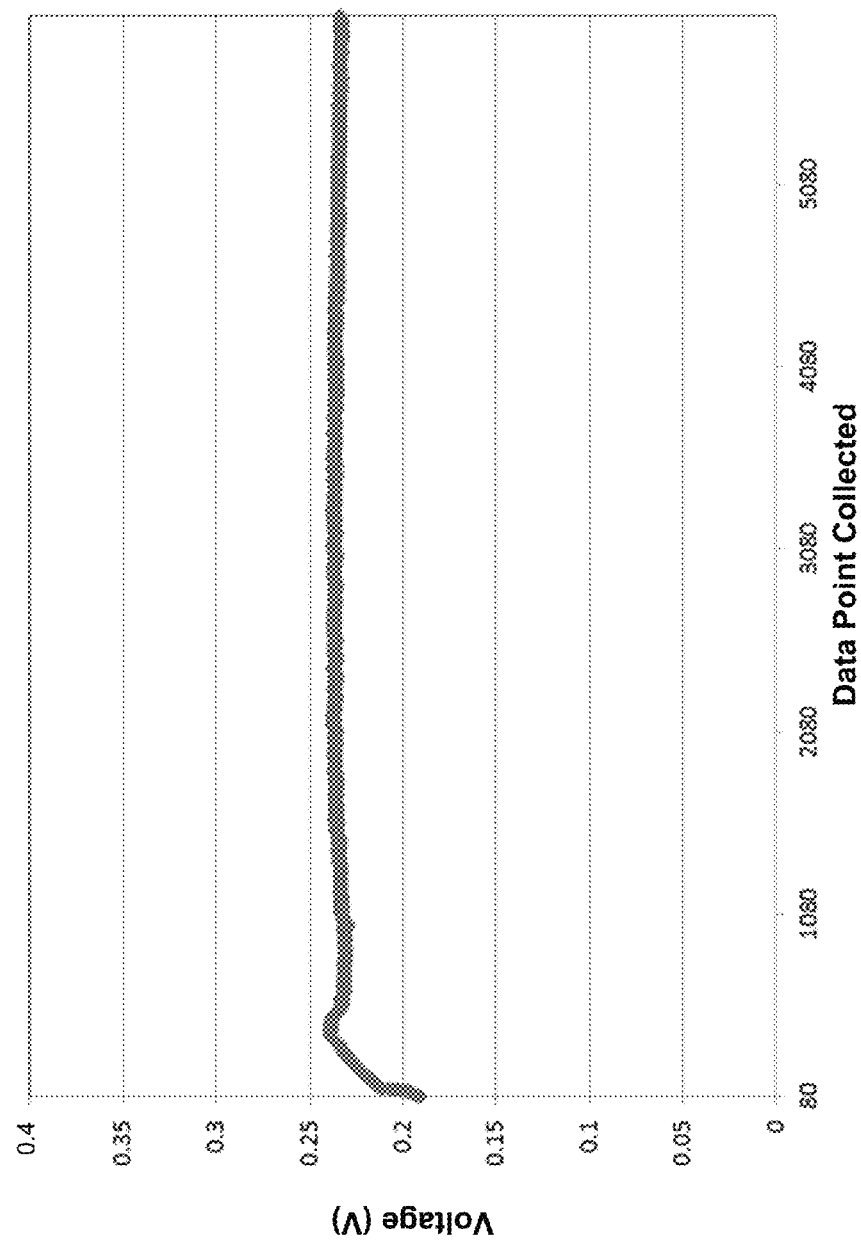
FIG. 20B shows a graph of OCP for one pair of electrodes under a load, according to an example of the present disclosure.
Figure 21:
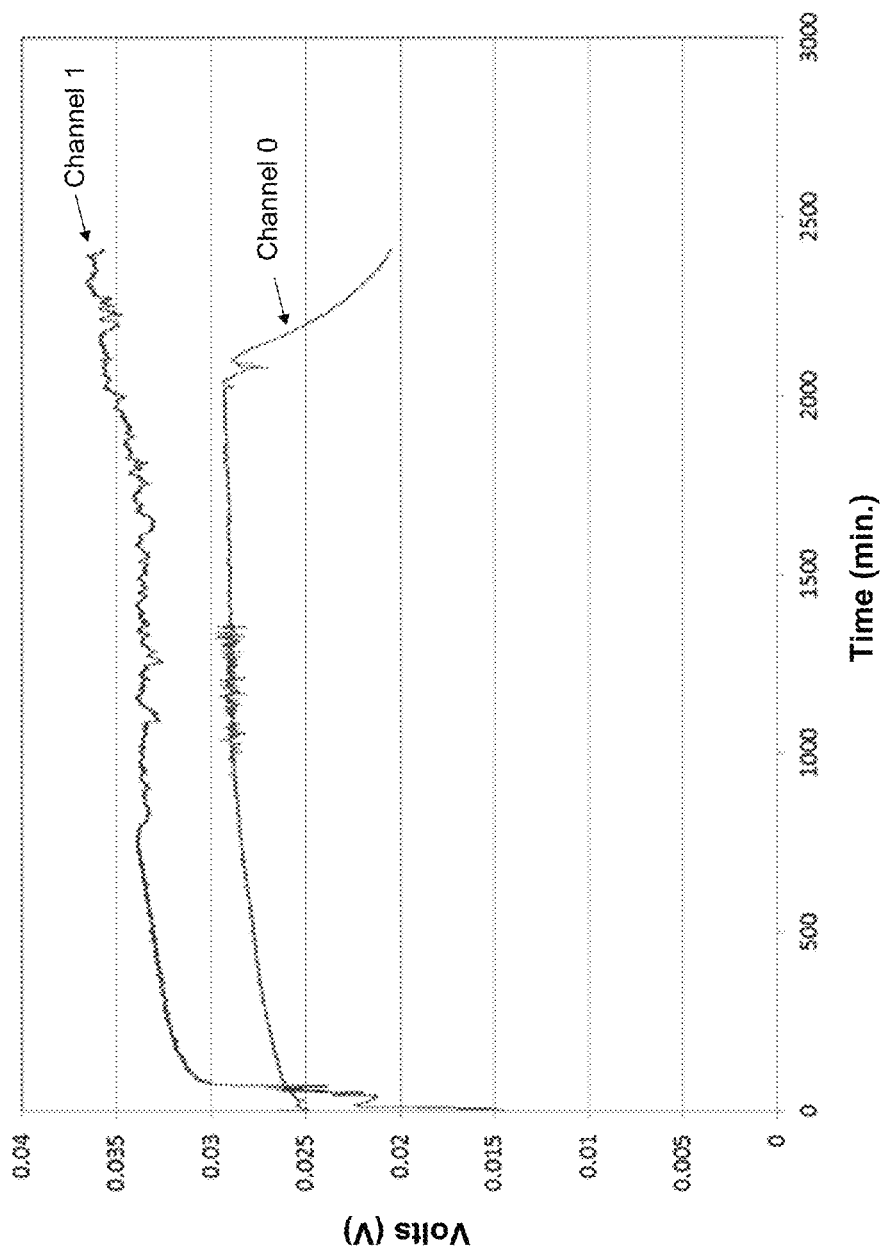
FIG. 21 shows a graph of voltage over time for each of two pairs of electrodes, according to an example of the present disclosure.

Voltage generated by an electrode pair of an apparatus according to FIGS. 11A-11B described above was measured, both without (FIG. 20A) and with (FIGS. 20B and 21) a load applied. FIG. 20A shows the open circuit potential (OCP) of one pair of electrodes, and FIG. 20B shows the OCP for one pair of electrodes under a 100 ohm resistor acting as a load. FIG. 21 shows the voltage generated by two different pairs of electrodes under a constant 100 ohm resistor acting as the load. In FIG. 21, "Channel 0" indicates data for an unrefined set of electrodes with only 1 mm of Ag and AgCl plating on the electrodes, whereas "Channel 1" indicates data for a refined set of electrodes with 2 mm of Ag and AgCl plating. Higher voltage was measured for the refined set of electrodes.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

I claim:

1. An apparatus comprising:
a top manifold comprising at least one inlet, said at least one inlet is configured to deliver a fluid to be desalinated to said apparatus;
a bottom manifold comprising at least one outlet, said at least one outlet is configured to allow the fluid after desalination to be drained out of said apparatus;
a casing connecting the top manifold and the bottom manifold to define an internal space therebetween; and
at least one electrode set disposed in the internal space, the at least one electrode set comprising:
a silver chloride cathode in fluid communication with a first fluid container comprising a first aqueous solution comprising sodium chloride;
a silver anode in fluid communication with a second fluid container comprising a second aqueous solution comprising sodium chloride;
a membrane disposed between the first fluid container and the second fluid container, the membrane configured to allow sodium and chloride ions to pass therethrough; and
a connector electrically connecting the cathode to the anode to form an electrical circuit.

2. The apparatus of claim 1, further comprising a controller configured to automatically control fluid flow from the at least one inlet to the at least one outlet.

3. The apparatus of claim 1, further comprising a controller configured to automatically control a sodium chloride concentration of the first aqueous solution.

4. The apparatus of claim 1, wherein the second aqueous solution has a sodium chloride concentration ranging from about 0.2 M to about 6.0 M.

5. The apparatus of claim 1, wherein the membrane is a semi-permeable, porous membrane.

6. The apparatus of claim 1, further comprising a filtration system in fluid communication with the at least one inlet.

7. The apparatus of claim 1, wherein the at least one electrode set comprises a plurality of electrode sets of a cell, and wherein the casing includes a plurality of cells each independently removable from the casing.

8. A method for generating electrical power and producing desalinated water, comprising:
electrically connecting a cathode comprising silver chloride to an anode comprising silver;
exposing the cathode to a flow of a first aqueous solution comprising sodium chloride, and exposing the anode to a flow of a second aqueous solution comprising sodium chloride, wherein the first aqueous solution has a sodium chloride concentration 1 to 4 orders of magnitude lower than a sodium chloride concentration of the second aqueous solution to provide a concentration differential of at least 1 order of magnitude, and wherein the cathode is separated from the anode by a semi-permeable membrane configured to allow chloride and sodium ions to pass therethrough; and
automatically controlling the sodium chloride concentration of the first aqueous solution to maintain the concentration differential;
wherein the method generates electrical power; and
wherein the sodium chloride concentration of the second aqueous solution is lower after contacting the anode than the sodium chloride concentration of the second aqueous solution before contacting the anode.

9. The method of claim 8, wherein the sodium chloride concentration of the second aqueous solution ranges from about 0.2 M to about 6.0 M before contacting the anode.

10. The method of claim 8, further comprising continuously delivering the second aqueous solution to the anode.

11. The method of claim 8, wherein the sodium chloride concentration of the first aqueous solution ranges from about 0.006 M to about 0.1 M.

12. The method of claim 8, wherein the flow of the first aqueous solution recirculates to repeatedly contact the cathode.

13. The method of claim 8, wherein each of the cathode and the anode has a planar, mesh configuration.

14. The method of claim 8, wherein the membrane is a porous membrane.

15. The method of claim 8, wherein the cathode and the anode form a first electrode set of a plurality of electrode sets, and wherein the plurality of electrode sets are connected in parallel to form a cell.

16. The method of claim 15, wherein the cell generates from about 240 mV to about 50 V of power.

17. The method of claim 8, further comprising electronically controlling the flow of the second aqueous solution.

18. The method of claim 8, further comprising filtering the second aqueous solution prior to exposure to the anode.

19. An apparatus comprising a plurality of electrode sets disposed in a casing of a module, each electrode set comprising:
a silver chloride cathode in fluid communication with a first fluid container comprising a first aqueous sodium chloride solution;
a silver anode in fluid communication with a second fluid container comprising a second aqueous sodium chloride solution;
a membrane disposed between the first fluid container and the second fluid container, the membrane configured to allow chloride and sodium ions to pass therethrough; and
a connector electrically connecting the silver cathode to the silver chloride anode to form an electrical circuit;
wherein the module comprises a controller configured to automatically maintain a differential in concentration of sodium chloride between the first aqueous sodium chloride solution and the second aqueous sodium chloride solution from 1 to 4 orders of magnitude.

* * * * *

UNITED STATES PATENT AND TRADEMARK OFFICE
CERTIFICATE OF CORRECTION

| | | |
|---|---|---|
| PATENT NO. | : 9,666,873 B2 | Page 1 of 1 |
| APPLICATION NO. | : 14/734652 | |
| DATED | : May 30, 2017 | |
| INVENTOR(S) | : Grant R. Page | |

It is certified that error appears in the above-identified patent and that said Letters Patent is hereby corrected as shown below:

In the Specification

Column 22, Line 53 - There should be a ")" immediately before the last "." in the line.

In the Claims

Column 23, Line 21 - "I claim:" to "We claim:".

Signed and Sealed this
Third Day of October, 2017

Joseph Matal
*Performing the Functions and Duties of the*
*Under Secretary of Commerce for Intellectual Property and*
*Director of the United States Patent and Trademark Office*